(12) United States Patent
Cooper et al.

(10) Patent No.: US 8,565,946 B2
(45) Date of Patent: Oct. 22, 2013

(54) SYSTEM AND METHOD FOR VEHICLE CONTROL

(75) Inventors: Jared Cooper, Melbourne, FL (US);
Robert Bremmer, Melbourne, FL (US);
Eugene Smith, Melbourne, FL (US);
Brian Schroeck, Melbourne, FL (US);
Velmurugan Veilumuthu, Bangalore (IN); Srinand Sridhara Murthy, Bangalore (IN); Latha Belagumba Narasegowda, Bangalore (IN)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 13/175,284

(22) Filed: Jul. 1, 2011

(65) Prior Publication Data

US 2013/0006451 A1    Jan. 3, 2013

(51) Int. Cl.
*G05D 1/00*    (2006.01)
*G05D 3/00*    (2006.01)
*G06F 7/00*    (2006.01)
*G06F 17/00*    (2006.01)

(52) U.S. Cl.
USPC ......................................................... 701/19

(58) Field of Classification Search
USPC .......................................................... 701/19
See application file for complete search history.

(56) References Cited

U.S. PATENT DOCUMENTS

| 4,041,283 A | 8/1977 | Mosier |
| 4,042,810 A | 8/1977 | Mosher |
| 4,181,943 A | 1/1980 | Hugg et al. |
| 4,602,335 A | 7/1986 | Perlmutter |
| 5,744,707 A | 4/1998 | Kull |
| 6,225,919 B1 * | 5/2001 | Lumbis et al. ................. 340/933 |
| 7,395,141 B1 | 7/2008 | Seck |
| 2003/0213875 A1 * | 11/2003 | Hess et al. ................. 246/167 R |
| 2003/0236598 A1 * | 12/2003 | Villarreal Antelo et al. ... 701/19 |
| 2006/0025903 A1 * | 2/2006 | Kumar ............................ 701/19 |
| 2006/0138285 A1 | 6/2006 | Oleski et al. |

FOREIGN PATENT DOCUMENTS

| AU | 2010256020 A1 | 12/2011 |
| DE | 19645426 | 7/1997 |
| EP | 0114633 | 1/1984 |
| EP | 0257662 | 2/1988 |
| EP | 0539885 | 5/1993 |
| EP | 0755840 | 1/1997 |

(Continued)

OTHER PUBLICATIONS

Search Report and Written Opinion from corresponding PCT Application No. PCT/US2012/044367 dated Apr. 9, 2013.

*Primary Examiner* — Mary Cheung
*Assistant Examiner* — Frederick Brushaber
(74) *Attorney, Agent, or Firm* — GE Global Patent Operation; John A. Kramer

(57) ABSTRACT

A system includes a first propulsion subsystem and a second propulsion subsystem. The first propulsion subsystem is operable to provide electrical energy to a first communication device when operating in an ON mode. The second propulsion subsystem is operable to provide electrical energy to a second communication device when operating in the ON mode. The first propulsion subsystem and the second propulsion subsystem are controllable in a mode of operation where if one of the first propulsion subsystem or the second propulsion subsystem is controlled to be in an OFF mode, the other of the first propulsion subsystem and the second propulsion subsystem provides electrical energy to the respective first communication device or the second communication device.

17 Claims, 6 Drawing Sheets

(56) References Cited

FOREIGN PATENT DOCUMENTS

| | | |
|---|---|---|
| GB | 2188464 | 9/1987 |
| WO | 9003622 | 5/1990 |
| WO | 99/14093 | 3/1999 |
| WO | 2010139489 A1 | 12/2010 |
| WO | 2011031410 A2 | 3/2011 |

\* cited by examiner

SYSTEM AND METHOD FOR VEHICLE CONTROL

BACKGROUND

1. Technical Field

Embodiments of the invention relate to a system for controlling a vehicle, and an associated method.

2. Discussion of Art

Known powered vehicle systems may include one or more powered units (e.g., locomotives) and one or more non-powered units (e.g., freight cars or other rail cars). The powered units supply tractive force to propel the powered units and non-powered units. The non-powered units hold or store goods and/or passengers, and are not capable of self-propulsion. For example, some known powered vehicle systems have locomotives and rail cars for conveying goods and/or passengers along a track. Some known powered rail vehicle systems include several powered units. For example, the systems may include a lead powered unit, such as a lead locomotive, and one or more remote powered units, such as trailing locomotives, that are located behind and coupled with the lead powered unit. The lead and remote powered units supply tractive force to propel the system along the track.

The remote powered units may be organized in motive power groups referred to as consists. The lead powered unit can control the tractive efforts of the remote powered units in consist. The remote powered units in consist can consume fuel during a trip of the vehicle system. To reduce the amount of fuel consumed by the remote vehicles, one or more operational modes of the consist may be changed during operation.

However, changing operational modes of the consist may result in fluctuations of various components or systems of the consist. For example, changing operational modes may cause voltage fluctuations in electrical circuits of the consist, fluctuations in hydraulic pressures of the consist, or the like. These fluctuations may be incompatible with certain on-board control and/or communication systems of the consist. As a result, the on-board systems may be unable to operate due to the fluctuations.

It may be desirable to have a vehicle control system and method that differs in function from those systems that are currently available.

BRIEF DESCRIPTION

In one embodiment, a system includes a first propulsion subsystem and a second propulsion subsystem. The first propulsion subsystem is operable to provide electrical energy to a first communication device when operating in an ON mode. The second propulsion subsystem is operable to provide electrical energy to a second communication device when operating in the ON mode. The first propulsion subsystem and the second propulsion subsystem are controllable in a mode of operation where if one of the first propulsion subsystem or the second propulsion subsystem is controlled to be in an OFF mode, the other of the first propulsion subsystem and the second propulsion subsystem provides electrical energy to the respective first communication device or the second communication device.

In one embodiment, an isolation system for a vehicle system is provided. The isolation system includes an electrical isolation module operable to be communicatively coupled with at least one of plural remote vehicles of the vehicle system that are electrically coupled with each other to define a consist. The electrical isolation module is operable to electrically isolate a communication module so as to reduce or eliminate a voltage drop during a defined electro-mechanical event, and thereby to maintain communications of the communication module with a remotely located controller.

In one embodiment, a method is provided that includes instructing one or more remote powered vehicles in an electrically coupled consist to turn to an OFF mode when at least one other remote powered vehicle in the consist remains in an ON mode.

In one embodiment, a retrofit kit includes an electrical isolation module. The electrical isolation module can be installed in a lead vehicle that is coupled with one or more remote vehicles. The remote vehicles are electrically coupled with each other to define a consist. The electrical isolation module can be communicatively coupled with a remote vehicle to electrically isolate a communication module of the remote vehicle. The isolation may reduce or eliminate a voltage drop during a defined electro-mechanical event. By controlling the voltage drop, it may be possible to maintain communication of the communication module with the lead vehicle.

BRIEF DESCRIPTION OF THE DRAWINGS

The foregoing summary, as well as the following detailed description of certain embodiments of the presently described subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The invention will be better understood from reading the following description of non-limiting embodiments, with reference to the attached drawings, wherein below.

DETAILED DESCRIPTION

Figure 1:
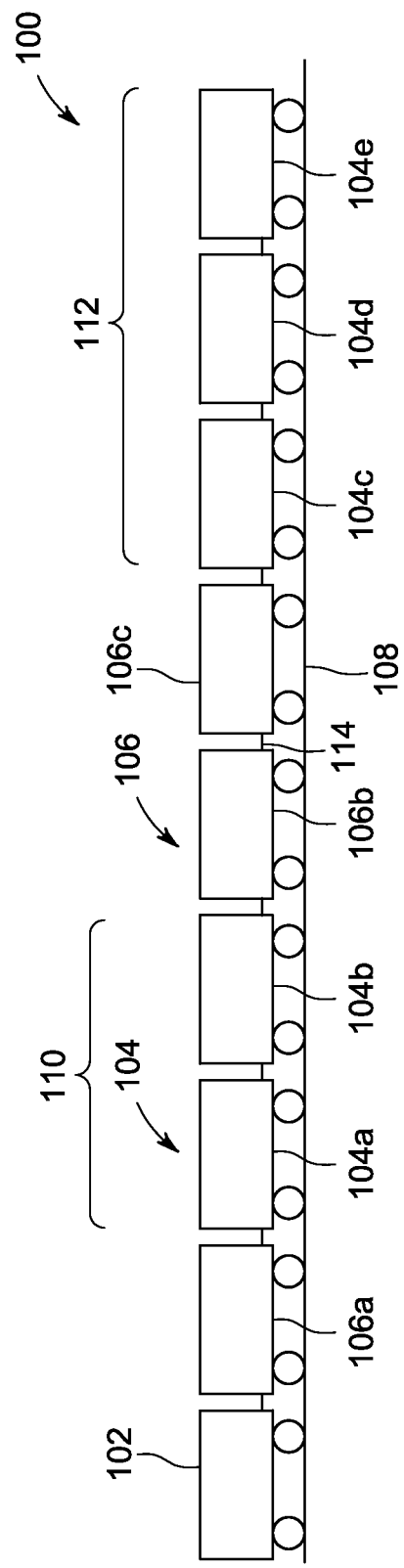
FIG. 1 is a schematic illustration of one embodiment of a vehicle system.

Embodiments of the invention relate to a system for controlling a vehicle, and to an associated method for vehicle control. At least one technical effect described herein includes the ability to continue controlling tractive efforts and/or braking efforts provided by a remote vehicle in a consist of remote vehicles from a lead vehicle when one or more remote vehicles in the consist are turned off, or operating in an OFF mode, and not supplying electrical energy to one or more communication devices of the consist that communicate with the lead vehicle. Although one or more embodiments may be described in connection with powered rail vehicle systems, the embodiments described herein are not limited to locomotives or to trains. In particular, one or more embodiments may be implemented in connection with different types of rail vehicles (e.g., a vehicle that travels on one or more rails, such as single locomotives and railcars, powered ore carts and other mining vehicles, light rail transit vehicles, and the like) and other vehicles and vehicle systems. Example embodiments of systems and methods for electrically isolating one or more vehicles in a vehicle consist while maintaining communication between one or more of the vehicles in the consist and another vehicle are provided.

As used herein, the term "vehicle system" includes two or more vehicles that operate together to travel along a route. The term "consist" can refer to a group of vehicles that are mechanically and/or logically linked together to travel along a route. According to various aspects of the invention, a consist may be defined based on one or more of the following: mechanical linkages, where vehicles in a consist are mechanically linked and adjacent to at least one other vehicle in the consist; electrical linkages, where vehicles are electrically linked for possibly transferring electrical power between the vehicles; and/or operational/functional linkages, where plural vehicles are controlled in a coordinated manner, e.g., certain modes of distributed power operations. As one example, in a rail vehicle context, a locomotive consist comprises plural locomotives that are mechanically (and possibly electrically) linked together, with each locomotive linked and adjacent to at least one other locomotive in the consist. For example, a consist of vehicles, or a vehicle consist, may include two or more vehicles that are mechanically coupled with each other and/or that communicate with each other over one or more wired and/or wireless connections to coordinate control of tractive efforts and/or braking efforts of the vehicles in the consist. A vehicle system can include one or more vehicle consists, such as a train that includes two or more motive power groups formed from two or more locomotives mechanically linked together with each other. The term "lead vehicle" refers to a vehicle that controls operations of one or more vehicles in the vehicle system, and does not necessarily mean the vehicle disposed at a front or leading end of a vehicle system. For example, a lead locomotive in a train may not be disposed at the front end of a train. The term "remote vehicle" refers to a vehicle other than the lead vehicle in a vehicle system. For example, a remote vehicle may include a locomotive that is controlled by a lead locomotive in a train. The term "remote" does not require a predetermined spacing or separation between items. For example, a remote vehicle may be directly coupled with a lead vehicle.

In one or more embodiments described herein, consists of a vehicle system include remote vehicles that are remotely controlled by a lead vehicle of the vehicle system. The consists include communication devices that receive control instructions from the lead vehicle to control tractive efforts and/or braking efforts of the remote vehicles in the consists. The communication devices may be powered by electric current generated by one or more propulsion subsystems of the remote vehicles in the consists. In one embodiment, at least one propulsion subsystem in each consist remains active and in an ON mode of operation to generate electric current to power at least one communication device in the consist when one or more other propulsion subsystems in the same consist are deactivated and switched to an OFF mode of operation. In a consist having two or more vehicles, the propulsion subsystem of at least one vehicle remains in the ON mode of operation to power at least one communication device while the other propulsion subsystems of the other vehicles may turn to the OFF mode of operation. For example, in a consist having two vehicles, one vehicle may turn to the OFF mode of operation while another vehicle remains in or turns to the ON mode of operation. In another example, in a consist having three or more vehicles, at least two of the vehicles may turn to the OFF mode of operation while at least one vehicle turns to or remains in the ON mode of operation. Keeping at least one propulsion subsystem in the ON mode of operation can ensure that one or more communication devices on the consist remain powered and able to communicate with the lead vehicle.

FIG. 1 is a schematic illustration of one embodiment of a vehicle system 100. The vehicle system 100 is shown as being a train, but alternatively may be formed from one or more other types of vehicles. The vehicle system 100 includes a lead vehicle 102 coupled with several remote vehicles 104 and non-powered vehicles 106. The lead vehicle 102 and remote vehicles 104 may be referred to as powered vehicles as the lead vehicle 102 and remote vehicles 104 are capable of generating tractive efforts for self propulsion. For example, the lead vehicle 102 and remote vehicles 104 may be locomotives traveling along a route 108 (e.g., a track). The non-powered vehicles 106 may be incapable of generating tractive efforts for self propulsion. For example, the non-powered vehicles 106 may be cargo cars that carry goods and/or persons along the route 108. As shown in FIG. 1, the remote vehicles 104 are referred to by the reference number 104 and individually referred to by reference numbers 104a, 104b, 104c, and so on. Similarly, the non-powered vehicles 106 are referred to by the reference number 106 and individually referred to by reference numbers 106a, 106b, and 106c. The number of vehicles 102, 104, 106 shown in FIG. 1 is provided as an example and is not intended to limit all embodiments of the subject matter described herein.

The remote vehicles 104 are arranged in motive power groups to define vehicle consists 110, 112. The remote vehicles 104 in a consist 110 and/or 112 may be mechanically and/or logically linked together to provide tractive effort and/or braking effort to propel and/or stop movement of the vehicle system 100. In one embodiment, the lead vehicle 102 coordinates control of the remote vehicles 104 in the consists 110, 112 to control a net or total tractive effort and/or braking effort of the vehicle system 100. For example, the vehicle system 100 may operate in a distributed power (DP) mode of operation where the lead vehicle 102 remotely directs the tractive efforts and/or braking efforts of the remote vehicles 104 in the consists 110, 112 from the lead vehicle 102. In the illustrated embodiment, the lead vehicle 102 is interconnected with, but spaced apart from, the consists 110, 112 by one or more non-powered vehicles 106.

The lead vehicle 102 and the remote vehicles 104 are communicatively coupled with each other by one or more wired and/or wireless connections or communication links. As used herein, the term "communicatively coupled" means that two components are able to communicate (e.g., transmit and/or receive) data with each other by wired and/or wireless connections. For example, the lead vehicle 102 may communicate with one or more of the remote vehicles 104 via a wireless network. Alternatively, or additionally, the lead vehicle 102 may be conductively coupled with the remote vehicles 104 by one or more tangible communication pathways 114, such as conductive wires or cables (e.g., multiple unit or MU cable bus), fiber optic cables, and the like. As described below, the lead vehicles 102 and the remote vehicles 104 may communicate with each other using electrically powered communication devices. The communication devices can include transceivers and/or antennas that communicate data (e.g., network or packetized data or non-network data) between each other through one or more of the communication links between the communication devices.

One or more of the communication devices in the consists 110, 112 may be powered by the remote vehicles 104. For example, each of the remote vehicles 104 in the consists 110, 112 can include a propulsion subsystem that generates electric current to, among other things, power traction motors to propel the vehicle system 100 and/or power communication devices disposed on-board the remote vehicles 104. Alternatively, one or more of the communication devices in the consists 110, 112 may be powered from an off-board power source, such as a source of electric current that is not located on the vehicle system 100. For example, the communication devices may receive electric current from a utility power grid via an overhead catenary, a powered third rail, or the like.

During travel along a route, the vehicle system 100 may demand less tractive effort than can be provided by the coordinated efforts of the lead vehicle 102 and the remote vehicles 104. For example, the vehicle system 100 may be traveling ahead of a schedule and may need to slow down to be back on schedule, the vehicle system 100 may be traveling down a decline in the route 108, the vehicle system 100 may have burned fuel and/or dropped off cargo such that the weight of the vehicle system 100 is less and less tractive effort is required to propel the vehicle system 100, and the like. In order to provide less tractive effort, one or more of the remote vehicles 104 may turn off, such as by deactivating the propulsion subsystem on the remote vehicle 104 so that the propulsion subsystem is not generating electric current to power traction motors and/or a communication device on the remote vehicle 104.

In one embodiment, one or more of the remote vehicles 104 may switch from an ON mode of operation to an OFF mode of operation while the vehicle system 100 is moving along the route 108. In the ON mode, the propulsion subsystem of a remote vehicle 104 is turned on and activated such that the propulsion subsystem generates electric current to power propulsion devices (e.g., traction motors) that provide tractive effort and/or a communication device disposed on-board the remote vehicle 104. In the OFF mode, the propulsion subsystem of the remote vehicle 104 may be turned off and deactivated such that the propulsion subsystem does not generate electric current to power the propulsion devices and/or the communication device. As a result, a communication link between the communication device of the remote vehicle 104 that is in the OFF mode and the lead vehicle 102 may be broken or interrupted.

Alternatively, in the OFF mode of operation, the propulsion subsystem of a remote vehicle 104 may be placed into idle instead of in the OFF mode of operation. By "idle", it is meant that the propulsion subsystem remains active to produce electric current to power a communication device such that a communication link between the consist that includes the remote vehicle 104 and the lead vehicle 102 remains active, but the propulsion subsystem does not produce electric current to propel the remote vehicle 104. For example, the propulsion subsystem may not produce sufficient electric current to power traction motors that propel the remote vehicle 104.

As described above, the lead vehicle 102 may control or direct the tractive efforts of the remote vehicles 104 in the consists 110, 112 by sending instructions to the communication devices of one or more of the remote vehicles 104 in the consists 110, 112. When one or more of the remote vehicles 104 in a consist 110 and/or 112 are switched to the OFF mode of operation, at least one of the communication devices of the remote vehicles 104 in the consist 110 and/or 112 remains on and powered such that the lead vehicle 102 can continue to communicate with the remote vehicles 104 in the consists 110, 112 that are operating in the ON mode of operation.

For example, if the remote vehicle 104a of the consist 110 switches to the OFF mode of operation, the other remote vehicle 104b in the consist 110 may remain in the ON mode of operation so that the communication device of the remote vehicle 104b can continue to communicate with the lead vehicle 102 and the lead vehicle 102 can continue to control the tractive efforts and/or braking efforts of the remote vehicle 104b. In another example, if the remote vehicles 104c and 104e of the consist 112 switch to the OFF mode of operation, the other remote vehicle 104d in the consist 112 may remain in the ON mode of operation so that the communication device of the remote vehicle 104d can continue to communicate with the lead vehicle 102 and the lead vehicle 102 can continue to control the tractive efforts and/or braking efforts of the remote vehicle 104d.

In one embodiment, when one or more remote vehicles 104 of the vehicle system 100 switch to the OFF mode of operation, at least one remote vehicle 104 in each consist 110, 112 remains in the ON mode of operation to power at least one communication device in each consist 110, 112. For example, at least one communication device continues to receive electric current generated by a remote vehicle 104 such that the lead vehicle 102 can continue to issue control instructions to the remote vehicles 104 in the ON mode of operation. The remote vehicle 104 in each consist 110, 112 that remains in the ON mode of operation may be the same remote vehicle 104 that has the communication device that communicates with the lead vehicle 102 to receive the control instructions from the lead vehicle 102 to remotely control tractive efforts and/or braking efforts of the remote vehicle 104. For example, if the remote vehicle 104c has the communication device that is configured to receive control instructions from the lead vehicle 102, then the remote vehicle 104c may remain in the ON mode of operation while the remote vehicle 104d and/or the remote vehicle 104e turn to the OFF mode of operation. By "remotely control", it is meant that the lead vehicle 102 controls the remote vehicles 104 from a location that is disposed off-board the remote vehicles 104.

Alternatively, the remote vehicle 104 in each consist 110, 112 that remains in the ON mode of operation may be a different remote vehicle 104 that has the communication device that communicates with the lead vehicle 102 to receive the control instructions from the lead vehicle 102 to remotely control tractive efforts and/or braking efforts of the remote vehicle 104. For example, if the remote vehicle 104c has the communication device that is configured to receive control instructions from the lead vehicle 102, then the remote vehicle 104d and/or the remote vehicle 104e may remain in the ON mode of operation and supply electric current to the communication device to power the communication device (e.g., through one or more conductive pathways extending between the remote vehicles) while the remote vehicle 104c switches to the OFF mode of operation.

In one embodiment, by keeping at least one communication device of each consist 110, 112 on and activated, one or more remote vehicles 104 in the consist 110 and/or 112 may switch to the OFF mode of operation while the communication device can continue to receive control instructions from the lead vehicle 102 for the remote vehicles 104 that are in the ON mode of operation. The vehicle system 100 can continue to travel along the route 108 with different remote vehicles 104 switching between ON and OFF modes of operation to, among other things, reduce the fuel consumed by the vehicle system 100.

Figure 2:
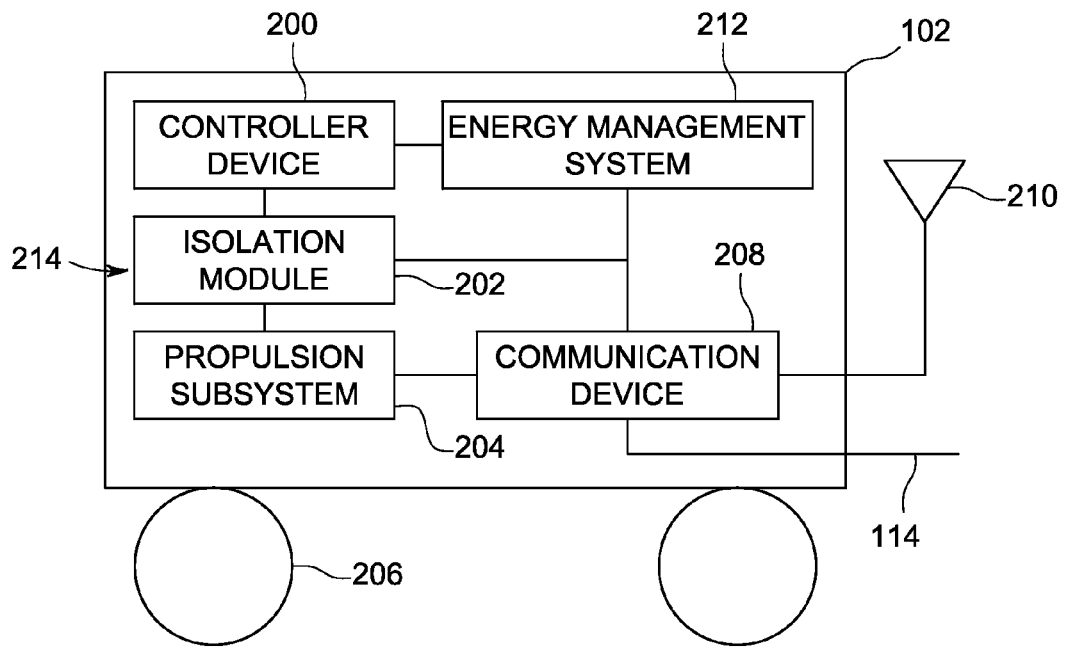
FIG. 2 is a schematic illustration of one embodiment of a lead vehicle in the vehicle system shown in FIG. 1.

FIG. 2 is a schematic illustration of one embodiment of the lead vehicle 102 in the vehicle system 100 shown in FIG. 1. The lead vehicle 102 includes a controller device 200 that forms the control instructions used to direct the tractive efforts and/or braking efforts of the remote vehicles 104 (shown in FIG. 1). For example, in a DP operation of the vehicle system 100, the controller device 200 can form data messages that are communicated to the remote vehicles 104 and that direct the remote vehicles 104 to change the tractive efforts and/or braking efforts provided by the remote vehicles 104. The controller device 200 can include one or more input/output devices that enable a human operator to manually control the tractive efforts and/or braking efforts of the lead vehicle 102 and/or remote vehicles 104.

The lead vehicle 102 includes an isolation system 214 that can be used to electrically isolate one or more remote vehicles 104 (shown in FIG. 1) in the consist 110 and/or 112 (shown in FIG. 1). In the illustrated embodiment, the isolation system 214 includes an isolation module 202 and a communication device 208. The isolation module 202 determines which remote vehicles 104 (shown in FIG. 1) to switch between the ON mode of operation and OFF mode of operation and/or when to switch the mode of operation of the remote vehicles 104. The isolation module 202 can make this determination based on a variety of factors. In one embodiment, the isolation module 202 can decide to turn one or more of the remote vehicles 104 to the OFF mode of operation based on an amount of fuel carried by the vehicle system 100. For example, the isolation module 202 may determine that a first remote vehicle 104 is to be turned to the OFF mode of operation while at least a second remote vehicle 104 remains in the ON mode of operation such that the first remote vehicle 104 maintains at least a threshold volume or amount of fuel for use by the propulsion subsystem on the first remote vehicle 104. The isolation module 202 may keep the second remote vehicle 104 in the ON mode of operation until the volume or amount of fuel carried by the second remote vehicle 104 reaches the same or a different threshold volume or amount of fuel. The isolation module 202 can then switch the first remote vehicle 104 to the ON mode of operation and the second remote vehicle 104 to the OFF mode of operation.

The isolation module 202 can continue to switch which remote vehicles 104 are in the ON mode of operation and which remote vehicles 104 are in the OFF mode of operation to achieve a desired distribution of fuel being carried by the remote vehicles 104 along the length of the vehicle system 100. For example, the isolation module 202 can vary which remote vehicles 104 are in the different modes of operation for different periods of time such that the amount of fuel carried by each remote vehicle 104 is within a predetermined percentage or fraction of each other (e.g., and the distribution of fuel being carried is approximately equal or balanced throughout the length of the vehicle system 100). Alternatively, the isolation module 202 may change the modes of operation over time such that a subset of the remote vehicles 104 located in a particular area of the vehicle system 100 (e.g., the consist 110) carry a different amount of fuel relative to a different subset of the remote vehicles 104 in a different area of the vehicle system 100 (e.g., the consist 112). A distribution of fuel being carried by the remote vehicles 104 along the length of the vehicle system 100 may be expressed as a volume or amount of fuel carried by the remote vehicles 104 at each location of the remote vehicles 104 in the vehicle system 100. For example, such a distribution may be expressed as "First Remote Vehicle 104a carrying 5,000 pounds of fuel; Second Remote Vehicle 104b carrying 3,000 pounds of fuel; Third Remote Vehicle 104c carrying 4,000 pounds of fuel" and so on.

The lead vehicle 102 includes a propulsion subsystem 204 that provides tractive effort and/or braking effort of the lead vehicle 102. As described below in connection with the remote vehicles 104 (shown in FIG. 1), the propulsion subsystem 204 can include an engine that consumes fuel to rotate a shaft connected to an electrical alternator or generator, which generates electric current to power traction motors of the lead vehicle 102. The traction motors can rotate axles and/or wheels 206 of the lead vehicle 102 to propel the lead vehicle 102. The propulsion subsystem 204 can include brakes (e.g., air brakes or regenerative/resistive brakes) that slow or stop movement of the lead vehicle 102.

The lead vehicle 102 includes the communication device 208 that communicates with one or more of the remote vehicles 104 (shown in FIG. 1). For example, the communication device 208 may transmit the control instructions from the controller device 200 to the remote vehicles 104 so that the lead vehicle 102 can control the tractive efforts and/or braking efforts of the remote vehicles 104. The communication device 208 may include a transceiver device or transmitter that is conductively coupled with the communication pathway 114 (e.g., a cable bus or MU cable bus). The communication device 208 can communicate the control instructions to the remote vehicles 104 through the communication pathway 114. Alternatively or additionally, the communication device 208 may be coupled with an antenna 210 to wirelessly transmit the control instructions to the remote vehicles 104, such as over a wireless network between the antenna 210 and the remote vehicles 104.

In one embodiment, the controller device 200 may cause a responsive action to be taken when a communication interruption event occurs. A communication interruption event can occur when a communication link between the communication device 208 and one or more of the consists 110, 112 (shown in FIG. 1) is interrupted or broken. For example, if the communication device 208 loses or is otherwise unable to communicate control instructions with communication devices of the consists 110, 112 such that the controller device 200 is unable to continue remotely controlling the remote vehicles 104 in the consists 110, 112, then the controller device 200 may cause a responsive action to be taken. A "broken" or "interrupted" communication link may be more than a temporary or transient interruption in communication. For example, a broken or interrupted communication link may exist when the lead vehicle 102 transmits one or more control instructions to a remote vehicle 104 and does not receive a confirmation or response from the remote vehicle 104 within a predetermined period of time, such as within one second, ten seconds, one minute, four minutes, or the like.

The responsive action that is taken may be a penalty or an emergency response, such as to apply brakes of the lead vehicle 102, remote vehicles 104, and/or non-powered vehicles 106 (shown in FIG. 1) to stop or slow movement of the vehicle system 100. The responsive action can be taken to avoid an accident if the controller device 200 loses the ability to communicate with one or more of the remote vehicles 104 in the consists 110, 112.

In the illustrated embodiment, the lead vehicle 102 includes an energy management system 212 that determines the tractive efforts and/or braking efforts of one or more of the remote vehicles 104 (shown in FIG. 1) during a trip of the vehicle system 100 (shown in FIG. 1). A trip of the vehicle system 100 includes the travel of the vehicle system 100 along the route 108 (shown in FIG. 1) from a starting location to a destination location. The trip plan may dictate or establish various tractive efforts and/or braking efforts of the different vehicles in a vehicle system for different portions or segments of the trip of the vehicle system. For example, the trip plan may include different throttle settings and/or brake settings for the lead vehicle and remote vehicles of the vehicle system during various segments of the trip. The trip plan may be based on a trip profile that includes information related to the vehicle system 100, the route 108, the geography over which the route 108 extends, and other information in order to control the tractive efforts and/or braking efforts of one or more of the lead vehicle 102 and/or remote vehicles 104.

The energy management system 212 can communicate the trip plan with the controller device 200 and/or the isolation module 202 to change the tractive efforts and/or braking efforts provided by the remote vehicles 104 as the vehicle system 100 travels according to the trip plan. For example, if the vehicle system 100 is approaching a steep incline and the trip profile indicates that the vehicle system 100 is carrying significantly heavy cargo, then the energy management system 212 may direct one or more of the lead vehicle 102 and/or the remote vehicles 104 to increase the tractive efforts supplied by the respective vehicle. Conversely, if the vehicle system 100 is carrying a smaller cargo load based on the trip profile, then the energy management system 212 may direct the lead vehicle 102 and/or remote vehicles 104 to increase the supplied tractive efforts by a smaller amount than the tractive efforts would otherwise be increased if the data indicated a heavier cargo load. The trip plan formed by the energy management system 212 is based on the trip profile, which can include information and factors such as changes in the route 108 (shown in FIG. 1) that the vehicle system 100 (shown in FIG. 1) travels along, regulatory requirements (e.g., emission limits) of the regions through which the vehicle system 100 travels, and the like, and based on the trip profile. In one embodiment, the energy management system 212 includes a software application such as the Trip Optimizer™ software application provided by General Electric Company, to control propulsion operations of the vehicle system 100 during the trip in order to reduce fuel consumption of the vehicles and/or to reduce wear and tear on the vehicle system 100.

The trip profile can be based on, or include, trip data, vehicle data, route data, and/or updates to the trip data, the vehicle data, and/or the route data. Vehicle data includes information about the vehicles 102, 104 (shown in FIG. 1) and/or cargo being carried by the vehicle system 100 (shown in FIG. 1). For example, vehicle data may represent cargo content (such as information representative of cargo being transported by the vehicle system 100) and/or vehicle information (such as model numbers, fuel efficiencies, manufacturers, horsepower, and the like, of locomotives and/or other railcars in the vehicle system 100).

Trip data includes information about an upcoming trip by the vehicle system 100 (shown in FIG. 1). By way of example only, trip data may include a trip profile of an upcoming trip of the vehicle system 100 (such as information that can be used to control one or more operations of the vehicles 102, 104, such as tractive and/or braking efforts provided during an upcoming trip), station information (such as the location of a beginning station where the upcoming trip is to begin, the location of refueling stops or locations, and/or the location of an ending station where the upcoming trip is to end), restriction information (such as work zone identifications, or information on locations where the route is being repaired or is near another route being repaired and corresponding speed/throttle limitations on the vehicle system 100), and/or operating mode information (such as speed/throttle limitations on the vehicle system 100 in various locations, slow orders, and the like).

Route data includes information about the route 108 (shown in FIG. 1) upon which the vehicle system 100 (shown in FIG. 1) travels. The route data may alternatively be referred to as map data. For example, the route data can include information about locations of damaged sections of the route 108, locations of sections of the route 108 that are under repair or construction, the curvature and/or grade of the route 108, GPS coordinates of the route 108, and the like. The route data is related to operations of the vehicle system 100 as the route data includes information about the route 108 that the vehicle system 100 is or will be traveling on.

The energy management system 212 can determine which of the remote vehicles 104 (shown in FIG. 1) to turn to the OFF mode of operation when the vehicle system 100 (shown in FIG. 1) is traveling along the route 108 (shown in FIG. 1) based on the trip plan. The energy management system 212 may examine an upcoming portion of the route 108 and the associated trip plan and, based on the upcoming portion and/or the trip plan, determine that one or more of the remote vehicles 104 can be switched from the ON mode of operation to the OFF mode of operation. For example, if the energy management system 212 examines the trip profile and determines that an upcoming portion of the route 108 includes a decline and, as a result, less tractive effort is required to travel down the decline, the energy management system 212 may decide to at least temporarily turn one or more of the remote vehicles 104 to the OFF mode of operation when the vehicle system 100 traverses the decline. The one or more remote vehicles 104 can be turned to the OFF mode of operation to conserve fuel that would otherwise be consumed by the one or more remote vehicles 104.

As another example, the energy management system 212 may determine that an upcoming portion of the route 108 (shown in FIG. 1) includes an incline and that additional weight of the vehicle system 100 (shown in FIG. 1) may assist in the wheels 206 (shown in FIG. 2) of the lead vehicle 102 and remote vehicles 104 (shown in FIG. 1) gripping the surface of the route 108 (e.g., the rails of a track). The energy management system 212 can decide to turn one or more of the remote vehicles 104 to the OFF mode of operation prior to the vehicle system 100 reaching the incline. The one or more remote vehicles 104 may be turned off such that less fuel is consumed by the remote vehicles 104 and the one or more remote vehicles 104 will be carrying the weight of the fuel that otherwise would be consumed when the one or more remote vehicles 104 reach the incline. This weight of the fuel that otherwise would be consumed can assist the wheels 206 of the vehicle system 100 in gripping the surface of the route 108 during the incline in order to reduce slippage of the wheels 206 on the route 108. For example, the energy management system 212 may keep one or more of the remote vehicles 104 in the OFF mode of operation such that one or more of the remote vehicles 104 has sufficient fuel weight to provide at least a threshold grip on a surface that is traversed by the vehicle system 100. One or more of the remote vehicles 104 may be later switched to the ON mode of operation to provide additional tractive effort to the vehicle system 100 to traverse the incline.

As another example, the energy management system 212 can determine which of the remote vehicles 104 (shown in FIG. 1) to turn to the ON mode and which of the remote vehicles 104 to turn to the OFF mode over time to balance or alternate fuel usage by different ones of the remote vehicles 104. The energy management system 212 may control or alternate which remote vehicles 104 are in the different modes of operation so that at least a subset or fraction of the remote vehicles 104 has sufficient fuel to propel the vehicle system 104 when needed for an upcoming portion of the trip.

As another example, the energy management system 212 can determine which of the remote vehicles 104 (shown in FIG. 1) to turn to the ON mode and which of the remote vehicles 104 to turn to the OFF mode based on a fuel efficiency of one or more of the remote vehicles 104. The term "fuel efficiency" can mean a fuel economy or thermal efficiency of a remote vehicle 104. For example, a first remote vehicle 104 that has a greater fuel efficiency than a second remote vehicle 104 may consume less fuel than the second remote vehicle 104 to provide the same amount of horsepower or electric energy (e.g., as measured in terms of watts).

The energy management system 212 may determine which remote vehicles 104 (shown in FIG. 1) to turn to the ON mode and/or OFF mode based on the fuel efficiency of one or more of the remote vehicles 104 by examining the fuel efficiencies of the remote vehicles 104 recorded within the energy management system 212, a remaining distance left to a destination location of the trip of the vehicle system 100 (shown in FIG. 1), and/or horsepower of one or more of the remote vehicles 104. For example, a trip may include flat terrain (e.g., terrain having undulations or peaks that rise above sea level of no greater than 300 meters or 984 feet), hilly terrain (e.g., terrain having undulation or peaks that rise above sea level more than 300 meters or 984 feet but less than 610 meters or 2,001 feet), and/or mountainous terrain (e.g., terrain having undulations or peaks that rise above sea level more than 610 meters or 2,001 feet). The energy management system 212 may change which remote vehicles 104 are turned ON or OFF based on the type of terrain, the fuel efficiencies of the remote vehicles 104, and how far the vehicle system 100 is to the end of the trip.

Table 1 below provides an example of how the energy management system 212 may turn different remote vehicles 104 (shown in FIG. 1) ON or OFF during a trip. The first column of Table 1 indicates the different numbered segments, or portions, of the trip. The second column of Table 1 indicates the type of terrain in the corresponding segment (e.g., flat, hilly, or mountainous). The third column of Table 1 indicates the miles of the trip encompassed by the corresponding segment. The fourth column indicates the operating state of a first remote vehicle 104 (e.g., ON for operating in the ON mode of operation and OFF for operating in the OFF mode of operation) for the corresponding segment. The fifth column indicates the operating state of a second remote vehicle 104 for the corresponding segment. In this example, the first remote vehicle 104 may have a greater fuel efficiency than the second remote vehicle 104, but produces one half of the horsepower of the second remote vehicle 104 (e.g., 2,000 HP versus 4,000 HP) and only has enough fuel to propel the vehicle system 100 for 800 miles (or 1,287 kilometers).

TABLE 1

| Segment No. | Terrain Type | Miles (Kilometers) of Trip | First Remote Vehicle Mode | Second Remote Vehicle Mode |
|---|---|---|---|---|
| 1 | Flat | 0 to 500 miles | ON | OFF |
| 2 | Hilly | 501 miles to 510 miles | OFF | ON |
| 3 | Mountainous | 511 miles to 520 miles | ON | ON |
| 4 | Flat | 520 miles to 900 miles | ON until low on fuel, then OFF | OFF until first remote vehicle is low on fuel, then ON |
| 5 | Mountainous | 901 miles to 920 miles | ON | ON |
| 6 | Flat | 921 miles to 1,000 miles | OFF or out of fuel | ON |

In the example illustrated in Table 1, the energy management system 212 changes which of the remote vehicles 104 (shown in FIG. 1) is turned ON or OFF during different segments of the trip. During the first relatively long, and flat, segment, only the more efficient first remote vehicle 104 is turned ON. During the second relatively short, hilly segment, the first remote vehicle 104 may be turned OFF to conserve fuel of the first remote vehicle 104 while the second remote vehicle 104 generates tractive effort to propel the vehicle system 100. During the relatively short and mountainous third segment, both the first and second remote vehicles 104 are turned ON. During the long fourth and flat segment, the first remote vehicle is ON until the first remote vehicle is low on fuel (e.g., the fuel reserves on the first remote vehicle fall to or below a threshold amount), at which point the first remote vehicle is turned OFF and the second remote vehicle is turned ON. The first remote vehicle can be turned back on during the short fifth segment that traverses mountainous terrain. During the final sixth segment, the first remote vehicle may be turned OFF or may be out of fuel. The second remote vehicle can remain ON to propel the vehicle system to the destination of the trip.

One or more of the controller device 200, the isolation module 202, and/or the energy management system 212 may represent a hardware and/or software system that operates to perform one or more functions. For example, the controller device 200, the isolation module 202, and/or the energy management system 212 may include one or more computer processors, controllers, or other logic-based devices that perform operations based on instructions stored on a tangible and non-transitory computer readable storage medium, such as a computer memory. Alternatively, the controller device 200, the isolation module 202, and/or the energy management system 212 may include a hard-wired device that performs operations based on hard-wired logic of the device. The controller device 200, the isolation module 202, and/or the energy management system 212 shown in FIG. 2 may represent the hardware that operates based on software or hard-wired instructions, the software that directs hardware to perform the operations, or a combination thereof.

Figure 3:
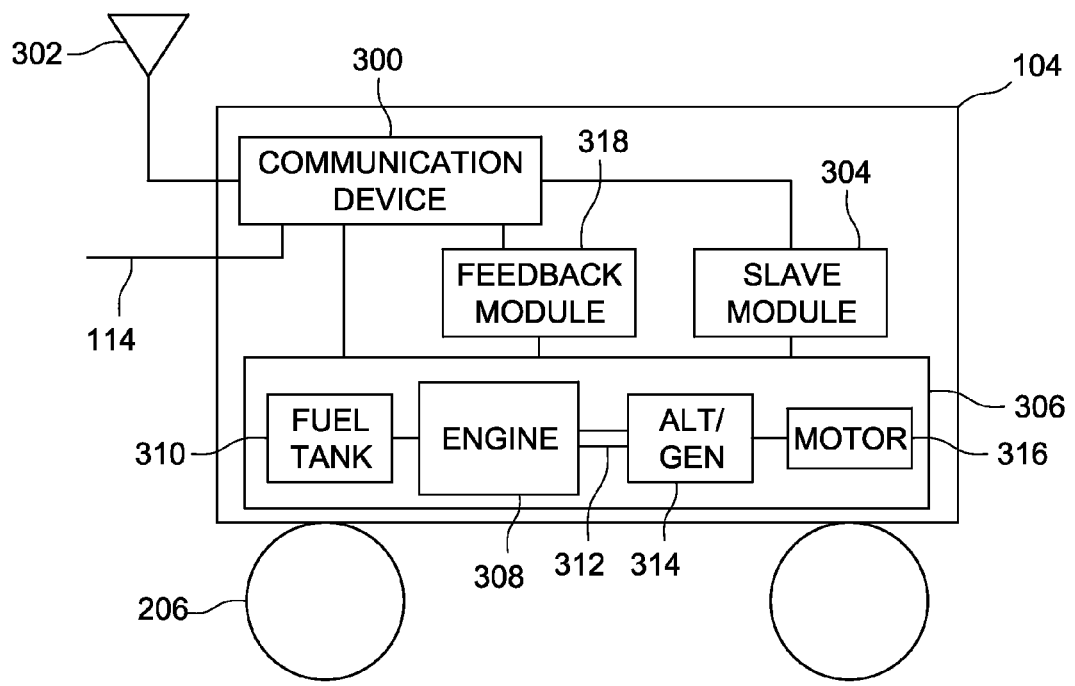
FIG. 3 is a schematic illustration of one embodiment of a remote vehicle shown in FIG. 1.

FIG. 3 is a schematic illustration of one embodiment of a remote vehicle 104. The remote vehicle 104 may represent one or more of the remote vehicles 104a, 104b, 104c, and so on, shown in FIG. 1. The remote vehicle 104 includes a communication device 300 that communicates with the lead vehicle 102 (shown in FIG. 1). For example, the communication device 300 may receive the control instructions transmitted from the lead vehicle 102 so that the lead vehicle 102 can control the tractive efforts and/or braking efforts of the remote vehicle 104. The communication device 300 may include a transceiver device or transmitter that is conductively coupled with the communication pathway 114 (e.g., a cable bus or MU cable bus). The communication device 300 can receive the control instructions from the lead vehicle 102 through the communication pathway 114. Alternatively or additionally, the communication device 300 may be coupled with an antenna 302 to wirelessly receive the control instructions from the lead vehicle 102.

As described above, the communication device 300 may be turned off (e.g., not be powered by the propulsion subsystem of the remote vehicle) when the remote vehicle is in the OFF mode of operation. However, in one embodiment, the communication device 300 or one or more components of the communication device 300 may remain powered when the remote vehicle is in the OFF mode of operation. For example, the communication device 300 may remain powered up, or ON, and continue to allow for communication through the pathway 114 with other communication devices 300 on other remote vehicles 104 that remain powered up, or ON, when the remote vehicles 104 are in the OFF mode of operation. As another example, the communication device 300 may include a network interface module, such as a network card and/or processor that allows for communication through the pathway 114 with other devices 300, that remains powered when the remote vehicle 104 is in the OFF mode of operation. The communication device 300 or network interface module can remain powered by a battery or other electrical energy storage device. The network interface module can allow for communications with the communication device 300 when the propulsion subsystem initially switches from the OFF mode to the ON mode.

The remote vehicle 104 includes a slave module 304 that receives the control instructions from the lead vehicle 102 (e.g., via the communication device 300) and implements the control instructions. For example, the slave module 304 may communicate with a propulsion subsystem 306 of the remote vehicle 104 to change tractive efforts and/or braking efforts provided by the propulsion subsystem 306 based on the control instructions received from the lead vehicle 102. The slave module 304 also may implement control instructions received from the isolation module 202 (shown in FIG. 2) of the lead vehicle 102. For example, the isolation module 202 may transmit an isolation command to the remote vehicle 104 (e.g., via the communication devices 208, 300). The slave module 304 can receive the isolation command and turn the propulsion subsystem 306 to the OFF mode of operation from the ON mode of operation. Alternatively, the isolation module 202 may transmit an activation command to the remote vehicle 104. The slave module 304 can receive the activation command and turn the propulsion subsystem 306 to the ON mode of operation from the OFF mode of operation.

The propulsion subsystem 306 of the remote vehicle 104 provides tractive effort and/or braking effort of the remote vehicle 104. The propulsion subsystem 306 can include an engine 308 that is fluidly coupled with a fuel tank 310. The engine 308 consumes fuel from the fuel tank 310 to rotate a shaft 312 that is coupled with an electrical alternator or generator 314 ("ALT/GEN 314" in FIG. 3). The alternator or generator 314 generates electric current based on rotation of the shaft 312. The electric current is supplied to one or more components of the remote vehicle 104 (and/or one or more other remote vehicles 104 or other vehicles in the vehicle system 100) to power the components. For example, the propulsion subsystem 306 may include one or more traction motors 316 that are powered by the electric current from the alternator or generator 314. The traction motors 316 can rotate axles and/or wheels 206 of the remote vehicle 104 to propel the remote vehicle 104. The propulsion subsystem 306 can include brakes (e.g., air brakes or regenerative/resistive brakes) that slow or stop movement of the remote vehicle 104.

The electric current from the propulsion subsystem 306 may be used to power the communication device 300. For example, the communication device 300 may be conductively coupled with the alternator or generator 314 to receive electric current that powers the communication device 300. In one embodiment, if energy of the electric current supplied to the communication device 300 drops below a threshold energy level, then the communication device 300 may turn off, such as by switching to an OFF mode of operation. In the OFF mode of operation for the communication device 300, the communication device 300 is unable to communicate with other communication devices, such as the communication device 208 (shown in FIG. 2) of the lead vehicle 102 (shown in FIG. 1) in one embodiment. The threshold energy level may represent a voltage level or current level that is sufficient to power the communication device 300 so that the communication device 300 can receive the control instructions from the lead vehicle 102 and/or transmit feedback data (as described below) to the lead vehicle 102. When the electric current has a voltage or other energy that drops below the threshold energy level, the communication device 300 may turn off. When the electric current rises above the threshold, the communication device 300 may turn on, or switch to an ON mode of operation, to re-commence communication with the communication device 208 of the lead vehicle 102.

In one embodiment, a communication device 300 located on-board a first remote vehicle 104 may be powered by electric current generated by the propulsion subsystem 306 of a different, second remote vehicle 104. For example, a communication device 300 disposed on-board a remote vehicle 104 in a consist 110 or 112 may be powered by electric current received from one or more other remote vehicles 104 in the same consist 110 or 112. The communication device 300 may be powered by at least one remote vehicle 104 in the consist 110 or 112 that is operating in the ON mode of operation when one or more other remote vehicles 104 are in the OFF mode of operation. For example, if the remote vehicle 104 on which the communication device 300 is disposed switches to the OFF mode of operation, then another remote vehicle 104 can supply electric current to the communication device 300 in order to power the communication device 300 and maintain a communication link with the lead vehicle 102 and the consist that includes the communication device 300. The communication device 300 disposed on-board one remote vehicle 104 may be conductively coupled with the propulsion subsystem 306 of another remote vehicle 104 by one or more wires, cables (e.g., MU cable bus), pathway 114, and the like, to receive the electric current.

The remote vehicle 104 may include a feedback module 318 that generates feedback data for use by the lead vehicle 102 (shown in FIG. 1). The feedback data can include a variety of information related to operation of the remote vehicle 104. For example, the feedback data can include a volume or amount of fuel being carried by the remote vehicle 104 (e.g., in the fuel tank 310). The feedback module 318 can include or represent one or more sensors (e.g., fuel gauge sensors) that obtain the feedback data. As described above, the lead vehicle 102 can use the volume or amount of fuel carried by the remote vehicle 104 to determine which of the remote vehicles 104 to switch to the OFF mode of operation or the ON mode of operation. The lead vehicle 102 may use the feedback data to determine the tractive efforts and/or braking efforts of the remote vehicles 104. The lead vehicle 102 may base the tractive efforts, braking efforts, and/or determination of which remote vehicles 104 are in the ON mode or OFF mode of operation based on the feedback data received from a subset or all of the remote vehicles 104 in the vehicle system 100 (shown in FIG. 1). As described above, one or more of the controller device 200 (shown in FIG. 2), the isolation module 202 (shown in FIG. 2), and/or the energy management system 212 (shown in FIG. 2) of the lead vehicle 102 can use the feedback data to control tractive efforts, braking efforts, and/or modes of operation of the remote vehicles 104.

One or more of the slave module 304 and/or the feedback module 318 may represent a hardware and/or software system that operates to perform one or more functions. For example, the slave module 304 and/or the feedback module 318 may include one or more computer processors, controllers, or other logic-based devices that perform operations based on instructions stored on a tangible and non-transitory computer readable storage medium, such as a computer memory. Alternatively, the slave module 304 and/or the feedback module 318 may include a hard-wired device that performs operations based on hard-wired logic of the device. The slave module 304 and/or the feedback module 318 shown in FIG. 3 may represent the hardware that operates based on software or hardwired instructions, the software that directs hardware to perform the operations, or a combination thereof.

Figure 4:
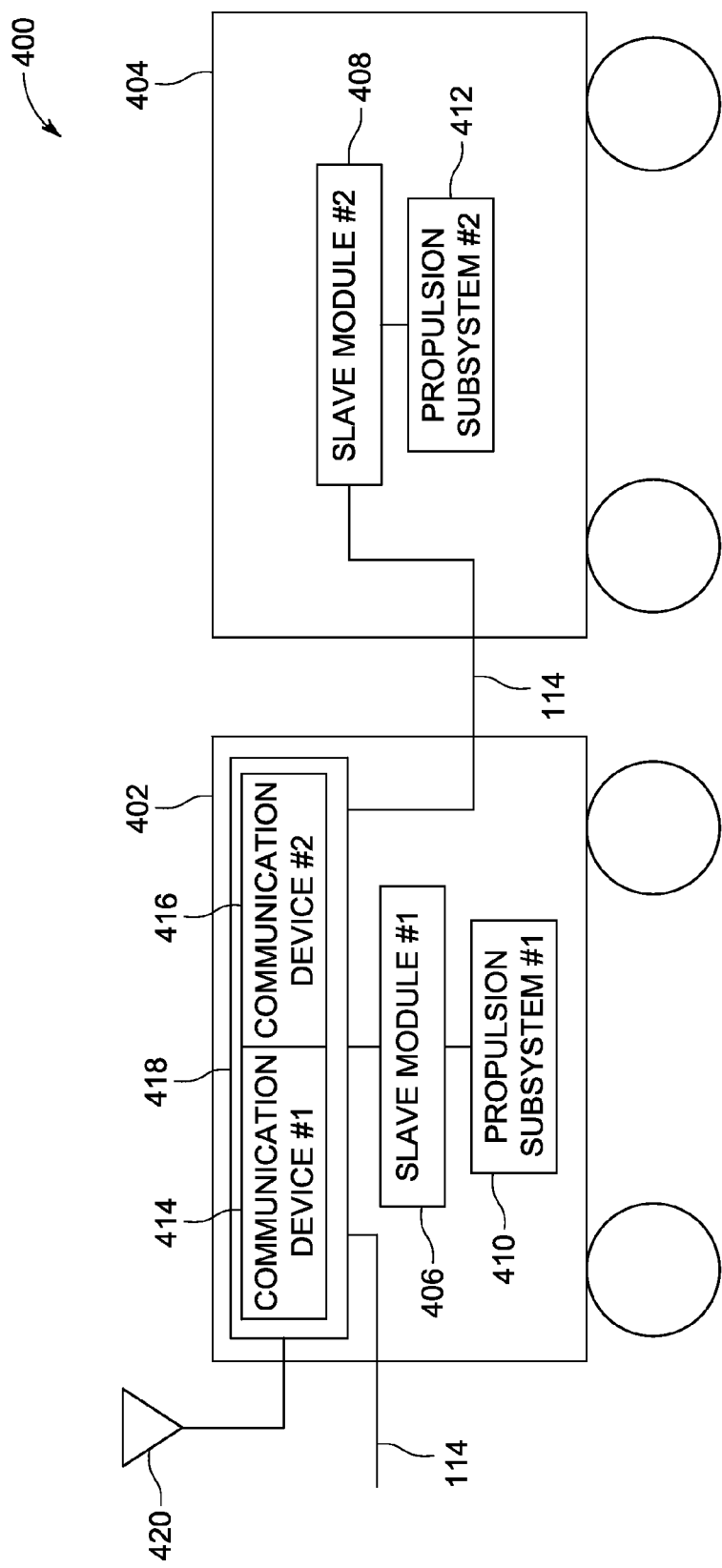
FIG. 4 is a schematic illustration of a consist of remote vehicles in accordance with another embodiment.

FIG. 4 is a schematic illustration of a consist 400 of remote vehicles 402, 404 in accordance with another embodiment. The consist 400 may be similar to one or more of the consists 110, 112 (shown in FIG. 1). For example, the consist 400 may include one or more remote vehicles that are mechanically and/or logically connected with each other. The remote vehicles 402, 404 may be similar to one or more of the remote vehicles 104 (shown in FIG. 1). For example, the remote vehicles 402, 404 may be vehicles of a vehicle system and be capable of generating tractive effort for self-propulsion.

In the illustrated embodiment, the remote vehicles 402, 404 include slave modules 406, 408 (e.g., "Slave Module #1" and "Slave Module #2") that may be similar to the slave module 304 (shown in FIG. 3). For example, the slave modules 406, 408 may receive control instructions from the lead vehicle 102 (shown in FIG. 1) and implement the control instructions to change the mode of operation, tractive efforts, and/or braking efforts of propulsion subsystems 410, 412 of the remote vehicles 402, 404 (e.g., "Propulsion Subsystem #1" and "Propulsion Subsystem #2"), as described above. Although not shown in FIG. 4, the remote vehicles 402, 404 can include feedback modules that are similar to the feedback module 318 (shown in FIG. 3).

The remote vehicles 402, 404 include communication devices 414, 416 (e.g., "Communication Device #1" and "Communication Device #2") that communicate with the communication device 208 (shown in FIG. 2) of the lead vehicle 102 (shown in FIG. 1). The communication devices 414, 416 may be similar to the communication device 300 (shown in FIG. 1). In one embodiment, the communication device 414 may receive control instructions, isolation commands, activation commands, and the like, and/or transmit feedback data for the remote vehicle 402 while the communication device 416 receives control instructions, isolation commands, activation commands, and the like, and/or transmit feedback data for the remote vehicle 404.

One difference between the remote vehicles 402, 404 shown in FIG. 4 and the remote vehicle 104 shown in FIG. 3 is that the communication device 416 for the remote vehicle 404 is disposed off-board the remote vehicle 404 and is disposed on-board the remote vehicle 402. For example, the communication device for one remote vehicle may be located on-board another remote vehicle in the same consist. The communication devices 414, 416 can be parts of a common communication module 418. For example, the communication devices 414, 416 may be contained within a common (e.g., the same) housing located on the remote vehicle 402. While only two communication devices 414, 416 are shown as being part of the common communication module 418, alternatively, three or more communication devices 414, 416 may be part of the same communication module 418. For example, one remote vehicle in a consist may include the communication devices for a plurality of the remote vehicles in the consist. Alternatively, the communication module 418 may include only a single communication device of a single remote vehicle.

The communication module 418 communicates with the communication device 208 (shown in FIG. 2) of the lead vehicle 102 (shown in FIG. 1) through a wired communication link (e.g., the pathway 114, another conductive wire or cable, a fiber optic cable, and the like) and/or using an antenna 420 (e.g., via a wireless network). The communication module 418 may act as a single communication device for plural remote vehicles in the same consist. The communication module 418 may maintain a communication link with the lead vehicle 102 to continue communications with the lead vehicle 102 when one or more of the remote vehicles 402, 404 switch to the OFF mode of operation. For example, if the remote vehicle 404 switches to the OFF mode of operation, the communication module 418 may continue to receive electric current from the propulsion subsystem 410 of the other remote vehicle 402 in the consist 400 and may continue to communicate with the lead vehicle 102. On the other hand, if the remote vehicle 402 switches to the OFF mode of operation, the communication module 418 may continue to receive electric current from the propulsion subsystem 412 of the other remote vehicle 404 in the consist 400 and may continue to communicate with the lead vehicle 102.

Returning to the discussion of the vehicle system 100 shown in FIG. 1, in order to prevent a break or interruption in communication between the lead vehicle 102 and one or more remote vehicles 104 in each of the consists 110 and 112, the isolation module 202 (shown in FIG. 2) of the lead vehicle 102 may coordinate the timing at which the remote vehicles 104 switch between modes of operation. In one embodiment, the isolation module 202 may direct the remote vehicles 104 in a consist 110 and/or 112 to switch between modes of operation such that at least one communication device 300, 414, 416 (shown in FIGS. 3 and 4) of the remote vehicles 104 in each consist 110, 112 maintains a communication link with the lead vehicle 102. For example, at least one communication device 300, 414, 416 of each consist 110, 112 may remain powered and configured to communicate with the lead vehicle 102 such that the communication device 300, 414, 416 can receive control instructions from the lead vehicle 102 during the switching of modes of operation.

Figure 5:
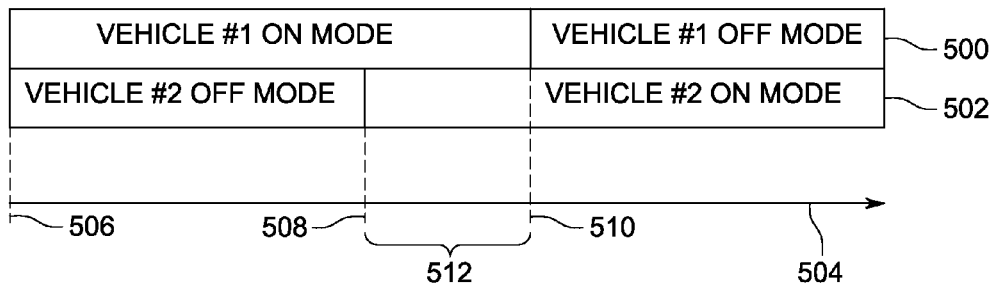
FIG. 5 illustrates example timelines of a switching procedure for changing modes of operation in a consist.

FIG. 5 illustrates example timelines 500, 502 of a switching procedure for changing modes of operation in a consist. The timelines 500, 502 represent one example of a procedure for two remote vehicles 104 (shown in FIG. 1) switching between ON and OFF modes of operation such that at least one communication device 300, 414, 416 (shown in FIGS. 3 and 4) remains on and powered for each consist 110, 112 (shown in FIG. 1).

The timelines 500, 502 are shown alongside a horizontal axis 504 that represents time. The timeline 500 represents the modes of operation for a first remote vehicle ("Vehicle #1"), such as the remote vehicle 104a (shown in FIG. 1) and the timeline 502 represents the modes of operation for a different, second remote vehicle ("Vehicle #2") in the same consist as the first remote vehicle, such as the remote vehicle 104b (shown in FIG. 1). At a first time 506, the first remote vehicle is operating in the ON mode of operation ("Vehicle #1 ON Mode") while the second remote vehicle is operating in the OFF mode of operation ("Vehicle #2 OFF Mode"). For example, the propulsion subsystem of the first remote vehicle may be on and active to generate electric current to power a communication device disposed on the first remote vehicle or the second remote vehicle. The propulsion subsystem of the second remote vehicle may be off and deactivated such that the propulsion subsystem does not generate electric current to power a communication device disposed on the first remote vehicle or the second remote vehicle. As described above, the powered communication device can continue to receive control instructions from the lead vehicle to control operations of the first remote vehicle.

The isolation module 202 (shown in FIG. 2) of the lead vehicle 102 (shown in FIG. 1) may decide to switch the first remote vehicle from the ON mode of operation to the OFF mode of operation. Prior to switching the mode of operation of the first remote vehicle, however, the isolation module 202 may direct at least one other remote vehicle in the same consist to remain in the ON mode of operation or to switch to the ON mode of operation to ensure that the communication device of the consist remains powered and able to communicate with the lead vehicle 102. For example, at a subsequent time 508, the isolation module 202 may direct the second remote vehicle to switch from the OFF mode of operation to the ON mode of operation. After the second time 508, both the first remote vehicle and the second remote vehicle are in the ON mode of operation and the propulsion subsystem of at least one of the first remote vehicle and the second remote vehicle may power one or more communication devices of the consist.

At a subsequent third time 510, the isolation module 202 (shown in FIG. 2) of the lead vehicle 102 (shown in FIG. 1) may direct the first remote vehicle to switch to the OFF mode of operation. In the illustrated embodiment, the first remote vehicle switches to the OFF mode of operation after the second remote vehicle switches to the ON mode of operation. The isolation module 202 can monitor electrical output from the propulsion subsystem 306 of the second remote vehicle that is switched from the OFF mode of operation to the ON mode of operation to determine when to switch the first remote vehicle from the ON mode of operation to the OFF mode of operation. For example, the isolation module 202 can measure one or more energy characteristics (e.g., total energy, voltage, or the like) of the electric current generated by the alternator or generator 314 (shown in FIG. 3) of the second remote vehicle. The isolation module 202 may directly measure the one or more energy characteristics via the pathway 114 (shown in FIG. 1) and/or may receive measurements of the energy characteristics from the second remote vehicle, such as by measured by one or more sensors (e.g., current or voltage sensors) on the second remote vehicle and communicated to the isolation module 202 using the communication device 300 (shown in FIG. 3). Once the one or more energy characteristics exceed one or more associated thresholds, the isolation module 202 may proceed to direct the first remote vehicle to switch from the ON mode of operation to the OFF mode of operation.

As shown in FIG. 5, both the first remote vehicle and the second remote vehicle are in the ON mode of operation for an overlapping time period 512 that extends from the second time 508 to the third time 510. The overlapping time period 512 indicates that at least one remote vehicle in the consist remains in the ON mode of operation to continue supplying power to one or more communication devices in the consist during the switching procedure. As a result, the lead vehicle 102 may continue to communicate with the remote vehicles of the consist without an interruption or break in the communication link.

In one embodiment, the isolation module 202 (shown in FIG. 2) may control the switching of the propulsion subsystems of the remote vehicles in a consist so as to reduce or eliminate a voltage drop in the supply of electrical energy to a communication module or device of the consist during a defined electro-mechanical event. For example, multiple remote vehicles in a consist may be conductively coupled with each other such that cranking of an engine in a first remote vehicle of the consist causes a voltage drop in one or more electrical circuits of the first remote vehicle and/or one or more other remote vehicles in the consist. The drop in voltage can cause the electrical energy that is supplied to one or more communication devices in the consist to drop below a threshold energy required to power the communication devices. As a result, the communication devices may turn off and/or electrically reset themselves. The communication devices may not turn back on for communication or complete the reset for a significant time period, such as several seconds or minutes. This delay can cause a break or interruption in the communication link between the lead vehicle and the consist and can cause the vehicle system to take responsive action, as described above.

In order to prevent such a voltage drop from breaking or interrupting the communication link, one or more of the propulsion subsystems in the consist remain on and activated to produce electrical energy and power the communication device during the electro-mechanical event. The propulsion subsystems may remain in the ON mode of operation such that the electric current supplied to the communication device(s) of the consist do not drop below the threshold energy needed to power the communication device during the electro-mechanical event. As a result, the communication link between the lead vehicle and the communication device(s) in the consist is not broken or interrupted during the electro-mechanical event.

For example, when a communication device 300 (shown in FIG. 3) on-board a first remote vehicle 104 (shown in FIG. 1) is turned on or activated, the communication device 300 may not have sufficient communication parameters for receiving control instructions from the lead vehicle 102 (shown in FIG. 1) to allow the lead vehicle 102 to control operations of the first remote vehicle 104 in a DP operation. The communication parameters may include settings, addresses, and the like, that are needed to communicate with the lead vehicle 102 via the communication link between the lead vehicle 102 and the first remote vehicle 104. When the communication device 300 is turned on or activated, the communication device 300 may acquire or set up the communication parameters used to communicate with the lead vehicle 102. The communication parameters may be acquired from the lead vehicle 102 or from a local memory. The communication parameters may be specific to that remote vehicle 104 and/or that communication device 300, and may differ from the communication parameters used by another remote vehicle 104 in the same consist and/or another communication device 300.

In order to ensure that the communication device 300 (shown in FIG. 3) that is turned on has the communication parameters for communicating with the lead vehicle 102 (shown in FIG. 1) before one or more other communication devices 300 in the same consist are turned off, the remote vehicle 104 (shown in FIG. 1) that is turning to the OFF mode may way until the communication parameters are transferred to the remote vehicle 104 being turned to the ON mode. For example, with respect to the timelines 500, 502 shown in FIG. 5, at the time 508, both the first and second remote vehicles 104 are in the ON mode and the communication parameters used by the first remote vehicle 104 to communicate with the lead vehicle 102 are used to communicate with the lead vehicle 102. For at least a period of time following the time 508, the second remote vehicle 104 may not have the communication parameters needed to communicate with the lead vehicle 102. As a result, the second remote vehicle 104 may be unable to communicate with the lead vehicle 102 for at least the period of time. During the overlapping time period that extends from the time 508 to the time 510, the communication device 300 of the first remote vehicle 104 can transfer the communication parameters to the second remote vehicle 104, such as by transmitting the communication parameters through the pathway 114 (shown in FIG. 1) or a wireless communication link. At or prior to the time 510, the transfer of the communication parameters to the second remote vehicle 104 is complete such that the second remote vehicle 104 can communicate with and receive control instructions from the lead vehicle 102. The first remote vehicle 104 may then deactivate and turn to the OFF mode without interrupting or breaking the communication link between the lead vehicle 102 and the consist that includes the first and second remote vehicles 104.

One or more components disposed on the lead vehicle 102 and/or remote vehicles 104 described herein can be provided in a retrofit kit or assembly. For example, the lead vehicle 102 may be originally manufactured or sold to a customer without the isolation module 202 installed or disposed on the lead vehicle 102. A retrofit kit or assembly can include the isolation module 202, such as a kit or assembly having hardware components (e.g., a computer processor, controller, or other logic-based device), software components (e.g., software applications), and/or a combination of hardware components and software components (e.g., a computer processor or other logic-based device and associated software application, a computer processor, controller, or other logic-based device having hard-wired control instructions, or the like). The kit or assembly may be purchased or provided to the current owner and/or user of the lead vehicle 102 so that the owner and/or user can install (or have installed) the isolation module 202 on the lead vehicle 102. The isolation module 202 may then be used in accordance with one or more embodiments described herein. While the above discussion of the retrofit kit or assembly focuses on the isolation module 202, the kit or assembly may also or alternatively include the energy management system 212 and/or one or more components disposed on the remote vehicle 104, such as the slave module 304 and/or the feedback module 318 described above in connection with FIG. 3.

Figure 6:
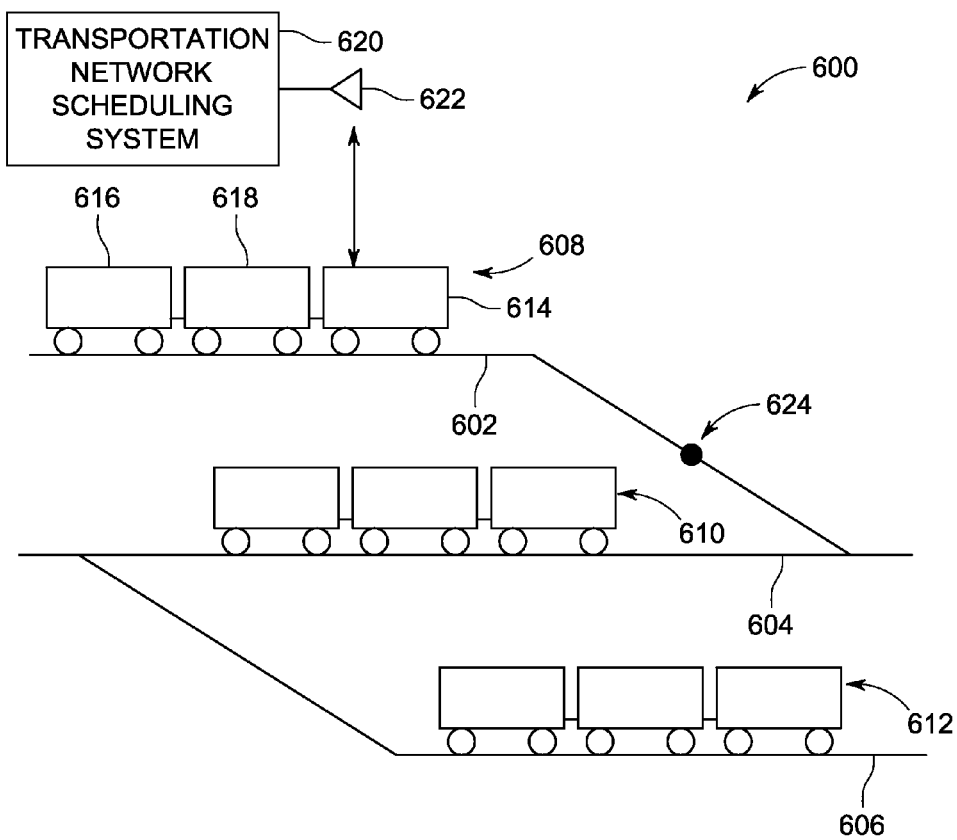
FIG. 6 is a schematic view of a transportation network in accordance with one embodiment.

FIG. 6 is a schematic view of a transportation network 600 in accordance with one embodiment. The transportation network 600 includes a plurality of interconnected routes 602, 604, 606, such as interconnected railroad tracks. The transportation network 600 may extend over a relatively large area, such as hundreds of square miles or kilometers of land area. The number of routes 602, 604, 606 shown in FIG. 6 is meant to be illustrative and not limiting on embodiments of the described subject matter. Plural separate vehicle systems 608, 610, 612 may concurrently travel along the routes 602, 604, 606.

One or more of the vehicle systems 608, 610, 612 may be similar to the vehicle system 100 (shown in FIG. 1). For example, the vehicle system 608 may include a lead vehicle 614 interconnected with one or more consists 616 (e.g., a motive power group of one or more mechanically and/or logically connected remote vehicles) by one or more non-powered vehicles 618. The consists 616 can include remote vehicles (e.g., remote vehicles 104, 402, 404 shown in FIGS. 1 and 4) that are remotely controlled by the lead vehicle 614, as described above. Also as described above, the lead vehicle 614 may direct the remote vehicles in the consist 616 to alternate between operating in ON modes of operation and OFF modes of operation, while keeping a communication link with the consist 616 open to continue controlling the remote vehicles that are in the ON mode of operation.

In one embodiment, the vehicle systems 608, 610, 612 travel along the routes 602, 604, 606 according to a movement plan of the transportation network 600. The movement plan is a logical construct of the movement of the vehicle systems 608, 610, 612 moving through the transportation network 600. For example, the movement plan may include a movement schedule for each of the vehicle systems 608, 610, 612, with the schedules directing the vehicle systems 608, 610, 612 to move along the routes 602, 604, 606 at associated times. The movement schedules can include one or more geographic locations along the routes 602, 604, 606 and corresponding times at which the vehicle systems 608, 610, 612 are to arrive at or pass the geographic locations.

The movement plan may be determined by a transportation network scheduling system 620. The scheduling system 620 may represent a hardware and/or software system that operates to perform one or more functions. For example, the scheduling system 620 may include one or more computer processors, controllers, or other logic-based devices that perform operations based on instructions stored on a tangible and non-transitory computer readable storage medium, such as a computer memory. Alternatively, the scheduling system 620 may include a hard-wired device that performs operations based on hard-wired logic of the device. The scheduling system 620 shown in FIG. 6 may represent the hardware that operates based on software or hardwired instructions, the software that directs hardware to perform the operations, or a combination thereof. As shown in FIG. 6, the scheduling system 620 can be disposed off-board (e.g., outside) the vehicle systems 608, 610, 612. For example, the scheduling system 620 may be disposed at a central dispatch office for a railroad company. The scheduling system 620 can include an antenna 622 that wirelessly communicates with the vehicle systems 608, 610, 612.

In one embodiment, the scheduling system 620 determines whether to change a mode of operation of one or more remote vehicles in the vehicle systems 608, 610, 612. For example, the scheduling system 620 may direct one or more of the remote vehicles in one or more of the vehicle systems 608, 610, 612 to switch from the ON mode of operation to the OFF mode of operation, and vice-versa, as described above. The scheduling system 620 can transmit instructions to an isolation module disposed on the lead vehicle 614, which directs the remote vehicles to change the mode of operation as indicated by the scheduling system 620. Also as described above, the remote vehicles may change modes of operation without interrupting or breaking a communication link between the lead vehicle 614 and one or more of the remote vehicles in the consist 616.

The scheduling system 620 may direct one or more remote vehicles in the vehicle systems 608, 610, 612 based on movement schedules of the vehicle systems 608, 610, 612. For example, if one or more vehicle systems 608, 610, 612 are running ahead of schedule, the scheduling system 620 may direct one or more remote vehicles in the vehicle systems 608, 610, 612 to turn to the OFF mode of operation (e.g., to slow down the vehicle system 608, 610, 612 running ahead of schedule) or to turn to the ON mode of operation (e.g., to speed up the vehicle system 608, 610, 612 running behind schedule).

In one embodiment, the scheduling system 620 may direct one or more remote vehicles in a vehicle system 608, 610, 612 to turn to the OFF mode of operation in order to allow the vehicle system 608, 610, 612 to skip or pass a refueling location 624 in the transportation network 600. The refueling location 624 represents a station or depot where the vehicle systems 608, 610, 612 may stop to acquire additional fuel to be added to the fuel tanks of the lead vehicles and/or remote vehicles. In order to reduce the time required to travel along a trip between a starting location and a destination location, the scheduling system 620 may control which remote vehicles in a vehicle system 608, 610, 612 are in the ON mode of operation and/or the OFF mode of operation to conserve fuel and allow the vehicle system 608, 610, 612 to skip one or more refueling locations 624. For example, if all or a substantial number of the remote vehicles in the vehicle system 608 were continually operating in the ON mode of operation during a trip, the vehicle system 608 may need to stop and refuel at the refueling location 624 in order to ensure that the vehicle system 608 has sufficient fuel to reach the destination location of the trip.

The scheduling system 620 may direct one or more of the remote vehicles to turn to the OFF mode of operation to conserve fuel and allow other remote vehicles to remain in the ON mode of operation such that the vehicle system 608 can pass the refueling location 624 without stopping to refuel. The scheduling system 620 can examine a geographic distance between a location of the vehicle system 608, 610, and/or 612 the refueling location 624, along with an amount of remaining fuel carried by one or more of the lead vehicles and/or remote vehicles in the vehicle system 608, 610, and/or 612 to determine if the corresponding vehicle system 608, 610, and/or 612 can proceed past the refueling location 624 without stopping to acquire additional fuel (e.g., skip the refueling location 624). The location of the vehicle system 608, 610, and/or 612 may be a current geographic location as determined by one or more location sensors, such as one or more Global Positioning System (GPS) receivers disposed on the vehicle system 608, 610, and/or 612 that is reported back to the scheduling system 620.

Figure 7:
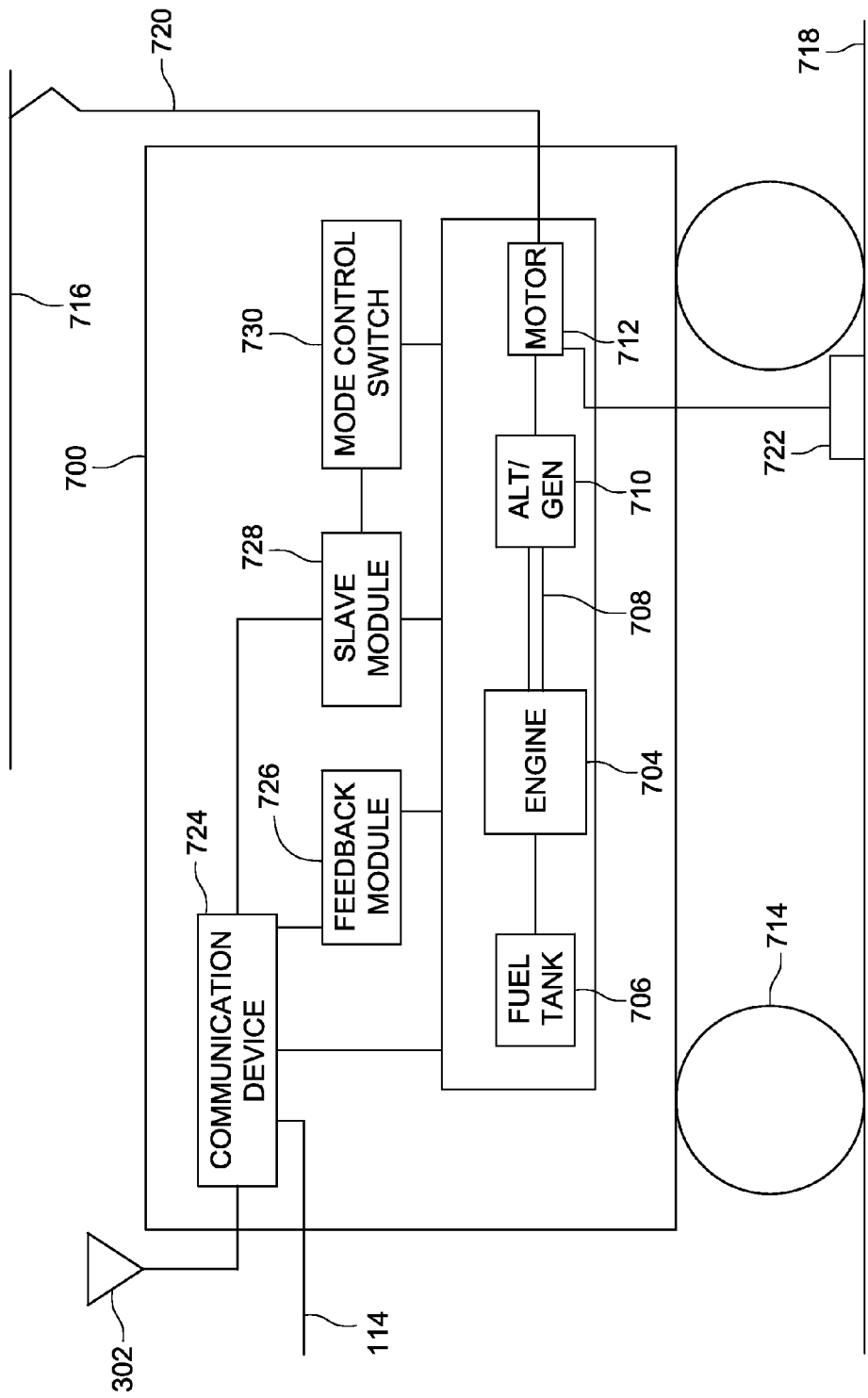
FIG. 7 is a schematic illustration of a remote vehicle in accordance with another embodiment.

FIG. 7 is a schematic illustration of a remote vehicle 700 in accordance with another embodiment. The remote vehicle 700 may be used in place of one or more of the remote vehicles described herein. For example, the remote vehicle 700 may be included in one or more of the vehicle systems 100, 608, 610, 612 (shown in FIGS. 1 and 6) described above.

The remote vehicle 700 is a multiple-mode powered vehicle. By "multiple-mode", it is meant that the remote vehicle 700 can generate tractive efforts for propulsion from a plurality of different sources of energy. In the illustrated embodiment, the remote vehicle 700 includes a propulsion subsystem 702 that can be powered from an on-board source of energy and an off-board source of energy. The on-board source of energy can be provided by an engine 704 that consumes fuel stored in an on-board fuel tank 706 to rotate a shaft 708. The shaft 708 is joined to an alternator or generator 710 ("ALT/GEN 710") that creates electric current based on rotation of the shaft 708, similar to the propulsion subsystem 306 shown and described in connection with FIG. 3. The electric current is supplied to one or more motors 712, such as traction motors, to power the motors 712 and cause the motors 712 to rotate axles and/or wheels 714 of the remote vehicle 700. Similar to the engine 308 shown in FIG. 3, the engine 704 can be engines that consume a combustible fuel, such as diesel fuel, hydrogen, water/steam, gas, and the like, in order to generate electric current that is used for movement of the remote vehicle 700.

The off-board source of energy can be obtained from a conductive pathway that extends along the route (e.g., the route 108 shown in FIG. 1) of the remote vehicle 700. As one example, the conductive pathway can include an overhead line or catenary 716 that extends along and above the route of the remote vehicle 700. As another example, the conductive pathway can include a powered rail 718 that extends along the route of the remote vehicle 700 below or to the side of the remote vehicle 700. For example, the conductive pathway can be a third rail that conveys electric current.

The propulsion subsystem 702 of the remote vehicle 700 includes a conductive extension 720 and/or 722 that engages the overhead line 716 or the powered rail 718 to convey the electric current from the overhead line 716 or powered rail 718 to the propulsion subsystem 702. The conductive extension 720 can include a pantograph device, a bow collector, trolley pole, a brush, or the like, and associated circuitry that engages the overhead line 716 to acquire and deliver electric current to the propulsion subsystem 702. The conductive extension 722 can include a conductive contact box, brush, or "shoe" that engages the powered rail 718 to acquire and deliver electric current to the propulsion subsystem 702. The overhead line 716 and/or powered rail 718 may receive the electric current that is supplied to the propulsion subsystem 702 from an off-board power source, such as a utility power grid, power station, feeder station, or other location that generates and/or supplies electric current that is not located on the remote vehicle 700 or the vehicle system that includes the remote vehicle 700. The electric current is delivered from the conductive extension 720 and/or 722 to the traction motors 712 of the propulsion subsystem 702 to power the traction motors 712 for rotation of the axles and/or wheels 714 of the remote vehicle 700. The electric current from the conductive extension 720 and/or 722 also may be used to power the communication device 724.

Similar to the remote vehicle 104 shown in FIG. 1, the remote vehicle 700 may include a communication device 724 that is similar to the communication device 300 (shown in FIG. 3), a feedback module 726 that is similar to the feedback module 318 (shown in FIG. 3), and/or a slave module 728 that is similar to the slave module 304 (shown in FIG. 3). The communication device 724, the feedback module 726, and/or the slave module 728 may perform the functions described above and associated with the respective communication device 300, feedback module 318, and/or slave module 304.

The remote vehicle 700 includes a mode control switch 730 in the illustrated embodiment. The mode control switch 730 is used to control where the propulsion subsystem 702 receives electric current to propel the remote vehicle 700. The mode control switch 730 may represent a hardware and/or software system that operates to switch between the propulsion subsystem 702 receiving electric current from an on-board source (e.g., the engine 704 and alternator or generator 710) or from on off-board source (e.g., the overhead line 716 or powered rail 718). For example, the mode control switch 730 may include one or more computer processors, controllers, or other logic-based devices that alternately open or close conductive circuits that prevent or allow, respectively, electric current to flow from the conductive extensions 720, 722 to the motors 712 and/or from the alternator or generator 710 to the motors 712. The processors, controllers, or other logic-based devices may open or close the circuits based on instructions stored on a tangible and non-transitory computer readable storage medium, such as a computer memory. Alternatively, the mode control switch 730 may include a hard-wired device that performs operations based on hard-wired logic of the device. In another embodiment, the mode control switch 730 may include a manual switch that is manually actuated by a human operator.

The mode control switch 730 is communicatively coupled with the slave module 728 in order to determine when the isolation module 202 (shown in FIG. 2) of the lead vehicle 102 (shown in FIG. 1) directs the remote vehicle 700 to switch from the ON mode of operation to the OFF mode of operation. In one embodiment, if the isolation module 202 directs the remote vehicle 700 to switch to the OFF mode of operation, the mode control switch 730 may prevent the propulsion subsystem 702 from switching to the OFF mode of operation if the propulsion subsystem 702 is receiving electric current from the off-board source (e.g., via the overhead line 716 or powered rail 718). For example, the mode control switch 730 may not allow the propulsion subsystem 702 to turn off when the propulsion subsystem 702 is powered from the off-board source and/or is not consuming fuel from the fuel tank 706 to produce electric current. The mode control switch 730 may prevent the propulsion subsystem 702 from switching to the OFF mode of operation based on the circuitry of the mode control switch 730, or based on software and/or hard-wired logic of the mode control switch 730.

In another embodiment, the mode control switch 730 may not permit the propulsion subsystem 702 to switch to the OFF mode of operation if the vehicle system that includes the remote vehicle 700 is providing electric current in a Head End Power (HEP) configuration. A HEP configuration includes the vehicle system having electrical power distribution circuits that extend throughout all or a substantial portion of the vehicle system and that supplies electric current generated in one vehicle to one or more, or all, of the other vehicles. For example, a HEP-configured vehicle system may include a lead vehicle that generates electric current for powering one or more components of the remote vehicles. The electric current may be used to power non-propulsion electric loads, such as loads used for lighting various vehicles, cooling or heating the air of the vehicles, and the like.

Alternatively, the slave module 728 may prohibit the propulsion subsystem 702 from switching to the OFF mode of operation when the propulsion subsystem 702 is receiving electric current from an off-board source. For example, the slave module 728 may monitor the mode control switch 730 to determine from where the propulsion subsystem 702 is receiving electric current. Based on this determination, the slave module 728 may ignore an instruction from the isolation module 202 (shown in FIG. 2) to switch the propulsion subsystem 702 to the OFF mode of operation. For example, if the slave module 728 determines that the mode control switch 730 is directing current from the off-board source to the propulsion subsystem 702, the slave module 728 may not turn the propulsion subsystem 702 to the OFF mode of operation, even when the isolation module 202 transmits an instruction to turn the propulsion subsystem 702 to the OFF mode of operation.

In one embodiment, the mode control switch 730 and/or the slave module 728 do not permit the propulsion subsystem 702 to switch to the OFF mode of operation if one or more parameters of the remote vehicle 700 are outside of or otherwise exceed one or more associated ranges or thresholds. For example, the mode control switch 730 and/or the slave module 728 may monitor a number of times that the propulsion subsystem 702 has been turned to the OFF mode of operation over a time window, an amount of electric current flowing through a battery regulator that is coupled with a rechargeable battery on the remote vehicle 700, an ambient temperature of the interior of the remote vehicle 700 (e.g., where the operator, passengers, and/or cargo are located), a temperature of the engine 704, a position or setting of one or more throttle controls and/or brake controls of the propulsion subsystem 702, an air pressure of an air brake reservoir, or the like.

If one or more of the parameters exceed thresholds or are outside of associated ranges, then the mode control switch 730 and/or the slave module 728 may not permit the propulsion subsystem 702 to switch to the OFF mode of operation. For example, if the number of times that the propulsion subsystem 702 has been turned off recently exceeds a threshold, then the mode control switch 730 and/or the slave module 728 may not permit the propulsion subsystem 702 to switch to the OFF mode of operation. If the current flowing through the battery regulator, the ambient temperature, or the engine temperature exceed associated thresholds or fall outside of associated ranges, then the mode control switch 730 and/or the slave module 728 may not permit the propulsion subsystem 702 to switch to the OFF mode of operation. If one or more propulsion control switches or settings are set to an engine start position, an engine isolate position, a run (e.g., active propulsion) position, or dynamic braking only position, then the mode control switch 730 and/or the slave module 728 may not permit the propulsion subsystem 702 to switch to the OFF mode of operation.

Figure 8:
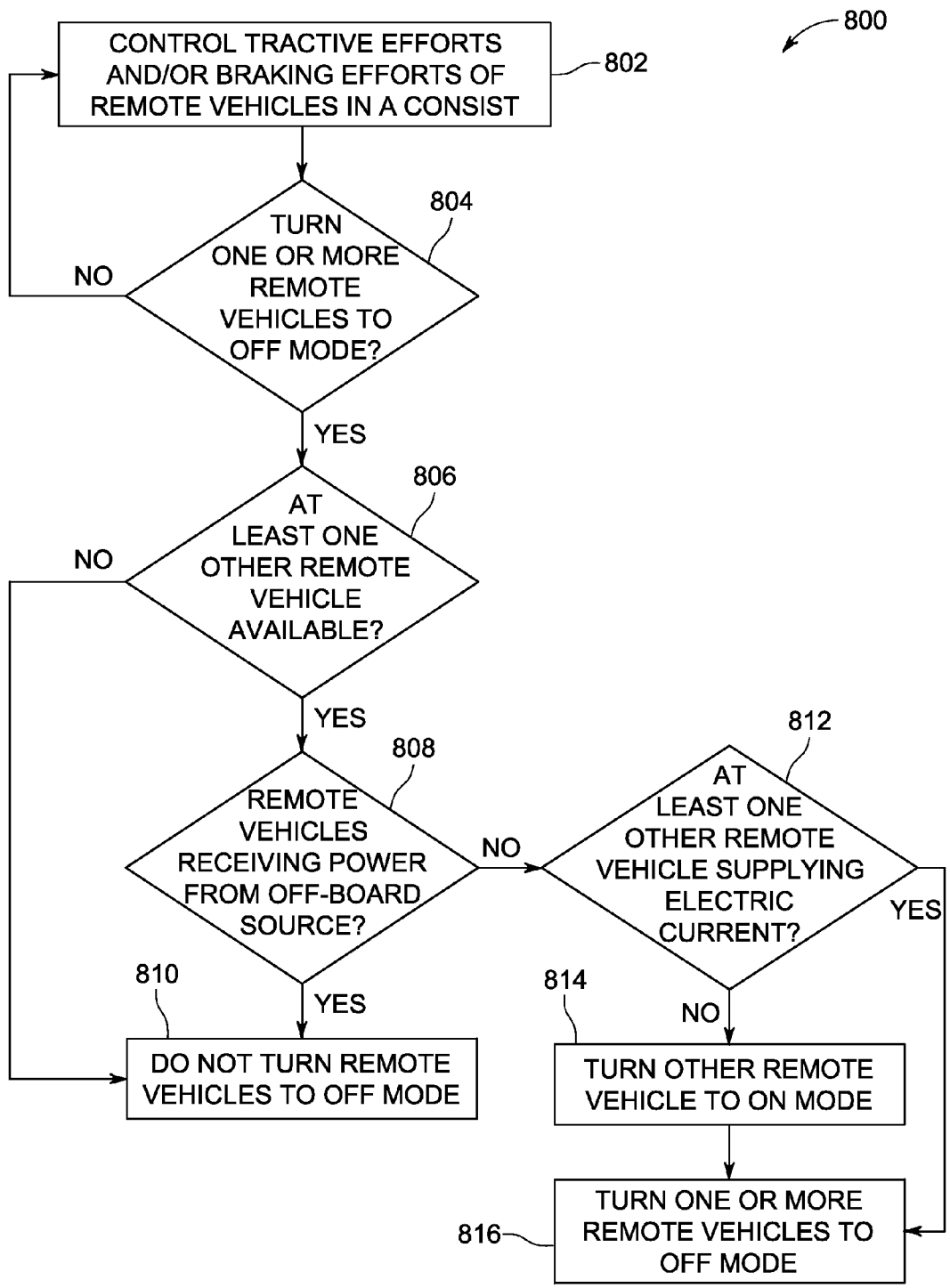
FIG. 8 is a flowchart of one embodiment of a method for remotely changing a mode of operation of one or more remote vehicles in a vehicle system.

FIG. 8 is a flowchart of one embodiment of a method 800 for remotely changing a mode of operation of one or more remote vehicles in a vehicle system. The method 800 may be used in conjunction with operation of one or more of the vehicle systems 100, 608, 610, 612 (shown in FIGS. 1 and 6) described above. For example, the method 800 may be used to determine whether to switch one or more remote vehicles in a consist of a vehicle system to the OFF mode of operation, which remote vehicles to switch to the OFF mode of operation, and to switch the one or more remote vehicles to the OFF mode of operation.

At 802, tractive efforts and/or braking efforts of remote vehicles in a consist of a vehicle system are remotely controlled. For example, the lead vehicle 102 (shown in FIG. 1) can direct the tractive efforts and/or braking efforts of the remote vehicles 104 (shown in FIG. 1) of the consist 110 and/or 112 (shown in FIG. 1). As described above, the lead vehicle 102 can control the tractive efforts and/or braking efforts in a DP configuration of the vehicle system 100 (shown in FIG. 1), based on instructions from the energy management system 212 (shown in FIG. 2), based on instructions from the scheduling system 620 (shown in FIG. 6), and/or based on manual control from an operator.

At 804, a determination is made as to whether one or more of the remote vehicles in a consist of the vehicle system is to be turned to the OFF mode of operation from the ON mode of operation. For example, the energy management system 212 (shown in FIG. 2) and/or the scheduling system 620 (shown in FIG. 6) may determine that a first remote vehicle 104 (shown in FIG. 1) in the consist 110 and/or 112 (shown in FIG. 1) can be turned to the OFF mode of operation to conserve fuel, put the vehicle system 100 (shown in FIG. 1) back on a schedule of the transportation network 600 (shown in FIG. 6), to skip an upcoming refueling location 624 (shown in FIG. 6), or the like, as described above.

If one or more of the remote vehicles in a consist can be switched to the OFF mode of operation, then flow of the method 800 may proceed to 806. On the other hand, if none of the remote vehicles are to be turned to the OFF mode of operation, then flow of the method 800 may return to 802.

At 806, a determination is made as to whether at least one other remote vehicle in the consist is available to continue supplying power to a communication device of the consist when the one or more remote vehicles are turned to the OFF mode of operation. For example, the consist 110 and/or 112 (shown in FIG. 1) may include one or more communication devices 300 (shown in FIG. 3) that communicate with the lead vehicle 102 (shown in FIG. 1) to allow the lead vehicle 102 to control the remote vehicles 104 (shown in FIG. 1) of the consist 110 and/or 112. At least a second remote vehicles 104 may be configured to continue supplying electric current to one or more of the communication devices 300 of the consist 110 and/or 112 to power the communication devices 300 when the first remote vehicle 104 is switched to the OFF mode of operation.

If the second remote vehicle 104 is available in the consist 110 and/or 112 to continue supplying the electric current to the communication devices 300 to power the communication devices 300 when the first remote vehicle 104 is turned to the OFF mode of operation, then the first remote vehicle 104 may be turned to the OFF mode of operation without interrupting or breaking the communication link between the lead vehicle 102 and the consist 110 and/or 112, as described above. As a result, flow of the method 800 may continue to 808.

On the other hand, if there is not another remote vehicle 104 (shown in FIG. 1) in the consist 110 and/or 112 (shown in FIG. 1) to continue supplying the electric current to the communication devices 300 (shown in FIG. 3) to power the communication devices 300 when the first remote vehicle 104 is turned to the OFF mode of operation, then the first remote vehicle 104 may not be turned to the OFF mode of operation without interrupting or breaking the communication link between the lead vehicle 102 and the consist 110 and/or 112 (shown in FIG. 1), as described above. As a result, flow of the method 800 may continue to 810.

At 808, a determination is made as to whether the remote vehicle(s) that can be turned to the OFF mode of operation are receiving electric current from an off-board source. For example, the first remote vehicle 104 (shown in FIG. 1) can be examined to determine if the first remote vehicle is receiving electric current to power one or more communication devices of the consist and/or the traction motors of the first remote vehicle from an off-board source, such as the overhead line 716 (shown in FIG. 7) and/or the powered rail 718 (shown in FIG. 7), as described above.

If the remote vehicle(s) to be turned to the OFF mode of operation are receiving electric current from an off-board source, then the remote vehicle(s) may not be turned to the OFF mode of operation. As a result, flow of the method 800 may proceed to 810. On the other hand, if the remote vehicle(s) to be turned to the OFF mode of operation are not receiving electric current from an off-board source, such as by producing electric current from an on-board engine and alternator or generator, then the remote vehicle(s) may be turned to the OFF mode of operation. As a result, flow of the method 800 may proceed to 812.

At 810, the remote vehicle(s) in the consist are not turned to the OFF mode of operation. For example, the first remote vehicle may not be turned to the OFF mode of operation described above because the communication link between the lead vehicle and the consist that includes the first remote vehicle may be interrupted or broken if the propulsion subsystem of the first remote vehicle were turned off. Alternatively, the first remote vehicle may not be turned to the OFF mode of operation because the first remote vehicle is receiving electric current from an off-board source, also as described above.

At 812, a determination is made as to whether at least one other remote vehicle in the consist is currently in the ON mode of operation to supply electric current to one or more communication devices of the consist. For example, the electric current that is supplied by one or more other remote vehicles 104 (shown in FIG. 1) of the consist 110 and/or 112 (shown in FIG. 1) to one or more communication devices 300 (shown in FIG. 3) of the consist 110 and/or 112 may be examined. If the one or more other remote vehicles 104 are operating in the ON mode of operation and supplying sufficient electric current to the communication device(s) 300 of the consist 110 and/or 112 such that turning the first remote vehicle 104 to the OFF mode of operation will not break or interrupt the communication link between the lead vehicle 102 (shown in FIG. 1) and the consist 110 and/or 112, then the first remote vehicle 104 may be switched to the OFF mode of operation without breaking or interrupting the communication link. As a result, flow of the method 800 proceeds to 816.

On the other hand, if no other remote vehicles in the consist are in the ON mode of operation and/or are supplying insufficient electric current to power communication device(s) of the consist, then the first remote vehicle may not be turned to the OFF mode of operation without acquiring a source of electric current to power the communication device(s) and maintain the communication link. As a result, flow of the method 800 proceeds to 814.

At 814, one or more other remote vehicles are switched to the ON mode of operation. For example, one or more other remote vehicles 104 (shown in FIG. 1) of the same consist 110 and/or 112 (shown in FIG. 1) as the first remote vehicle 104 may be switched to the ON mode of operation before switching the first remote vehicle 104 to the OFF mode of operation, as described above. In one embodiment, the first remote vehicle 104 is only switched to the OFF mode of operation after at least one other remote vehicle 104 is in the ON mode of operation and supplying sufficient electric current to the communication device(s) of the consist to maintain the communication link with the lead vehicle 102 (shown in FIG. 1).

At 816, the remote vehicle in the consist is turned to the OFF mode of operation. For example, the propulsion subsystem 302 (shown in FIG. 3) of the first remote vehicle 104 (shown in FIG. 1) of the consist 110 and/or 112 (shown in FIG. 1) may be turned to the OFF mode of operation, as described above. The propulsion subsystem 302 may be turned off while at least one communication device 300 (shown in FIG. 3) on the consist 110 and/or 112 remains on and powered to receive control instructions from the lead vehicle 102 (shown in FIG. 1) for control of operations of one or more other remote vehicles 104 in the same consist 110 and/or 112.

In one embodiment, a system is provided that includes a first propulsion subsystem and a second propulsion subsystem. The first propulsion subsystem is operable to provide electrical energy to a first communication device when operating in an ON mode. The second propulsion subsystem is operable to provide electrical energy to a second communication device when operating in the ON mode. The first propulsion subsystem and the second propulsion subsystem are controllable in a mode of operation where if one of the first propulsion subsystem or the second propulsion subsystem is controlled to be in an OFF mode, the other of the first propulsion subsystem and the second propulsion subsystem provides electrical energy to the respective first communication device or the second communication device.

In another aspect, at least one of the first propulsion subsystem or the second propulsion subsystem is controlled through instructions received via at least one of the first communication device or the second communication device from a remotely located controller device.

In another aspect, at least one of the first propulsion subsystem or the second propulsion subsystem are controllable in a distributed power (DP) operation of the system to define a consist, and the at least one of the first propulsion subsystem or the second propulsion subsystem that is controlled in the DP operation remains in the ON mode to supply tractive effort when the other of the first propulsion subsystem or the second propulsion subsystem is in the OFF mode.

In another aspect, the first propulsion subsystem and the second propulsion subsystem are configured to provide the electrical energy to the first communication device and the second communication device that are portions of a common communication module.

In another aspect, the first propulsion subsystem and the second propulsion subsystem are configured to provide the electrical energy to the communication module when at least one of the first propulsion subsystem or the second propulsion subsystem are operating in the ON mode, and thereby to provide the electrical energy to the communication module during operation at an electrical energy that is at or above a threshold energy level.

In another aspect, the first communication device is located on the first propulsion subsystem and the second communication device is located on the second propulsion subsystem. The first propulsion subsystem can supply the electrical energy to both the first communication device and the second communication device when the first propulsion subsystem is operating in the ON mode. The second propulsion subsystem can supply the electrical energy to both the first communication device and the second communication device when the second propulsion subsystem is operating in the ON mode.

In another aspect, the first propulsion subsystem switches from the ON mode to the OFF mode only after the second propulsion subsystem switches from the OFF mode to the ON mode.

In another aspect, the first propulsion subsystem is operable to propel a first vehicle and the second propulsion subsystem is operable to propel a second vehicle, and the first and second vehicles are mechanically coupled to each other.

In another aspect, at least one of the first propulsion subsystem or the second propulsion subsystem includes a feedback module operable to transmit feedback data related to operation of at least one of the first propulsion subsystem or the second propulsion subsystem to a controller device. At least one of the first propulsion subsystem or the second propulsion subsystem turns to the OFF mode when instructed by the controller device based on the feedback data.

In another aspect, at least one of the first propulsion subsystem or the second propulsion subsystem receives instructions from an energy management system of the controller device. The instructions control at least one of tractive effort or braking effort provided by one or more of the first propulsion subsystem or the second propulsion subsystem based on the feedback data.

In another aspect, at least one of the first propulsion subsystem or the second propulsion subsystem is configured to turn to the ON mode or to the OFF mode based on instructions received from the controller device that interfaces with a transportation network scheduling system that determines movement schedules of a vehicle propelled by one or more of the first propulsion subsystem or the second propulsion subsystem and at least one other vehicle traveling within a common transportation network.

In another aspect, the feedback data includes at least one of an amount of remaining fuel carried by at least one of the first propulsion subsystem or the second propulsion subsystem. The controller device determines which of the first propulsion subsystem and the second propulsion subsystem to turn to the ON mode or the OFF mode based on the feedback data.

In another embodiment, an isolation system for a vehicle system is provided. The isolation system includes an electrical isolation module operable to be communicatively coupled with at least one of plural remote vehicles of the vehicle system that are electrically coupled with each other to define a consist. The electrical isolation module is operable to electrically isolate a communication module so as to reduce or eliminate a voltage drop during a defined electro-mechanical event, and thereby to maintain communications of the communication module with a remotely located controller.

In another aspect, the electrical isolation module is operable to keep at least one of the remote vehicles that is controlled by a lead vehicle in a distributed power (DP) operation of the vehicle system in an ON mode of operation to continue supplying electrical energy to the communication module while one or more other remote vehicles is in an OFF mode of operation.

In another aspect, the electrical isolation module is configured to maintain communications between the communication module and the remotely located controller such that the remotely located controller controls tractive efforts provided by one or more of the remote vehicles by transmitting control instructions to the communication module.

In another aspect, the electrical isolation module is configured to maintain a communication link between the consist and the remotely located controller without a communication interruption event occurring that otherwise causes a responsive action be taken by one or more of the remote vehicles.

In another aspect, the communication link includes at least one of a wireless network or a conductive pathway that extends along the vehicle system.

In another aspect, the isolation module is configured to be communicatively coupled with at least one of an energy management system or a transportation network scheduling system. The isolation module also is configured to determine which of the remote vehicles to turn to an OFF mode to withhold supply of electrical energy to the communication module or to turn to an ON mode to supply the electrical energy to the communication module based on instructions received from the at least one of the energy management system or the transportation network scheduling system.

In another aspect, the electrical isolation module is configured to receive feedback data from one or more of the remote vehicles that is related to operations of the one or more of the remote vehicles.

In another aspect, the electrical isolation module is configured to communicate the feedback data to the energy management system so that the energy management system can determine which of the remote vehicles to turn to the OFF mode or the ON mode based on the feedback data.

In another aspect, the electrical isolation module is configured to communicate the feedback data to the energy management system so that the energy management system can employ map data that includes information related to an upcoming terrain over which the vehicle system is to travel in order to determine at least one of upcoming tractive effort requirements, braking requirements, or other propulsion requirements of the vehicle system. The energy management system is may determine which of the remote vehicles to turn to the ON mode and which of the remote vehicles to turn to the OFF mode based on the at least one of upcoming tractive effort requirements, braking requirements, or other propulsion requirements.

In another aspect, the electrical isolation module is configured to communicate the feedback data to the energy management system so that the energy management system can determine which of the remote vehicles to turn to the ON mode and which of the remote vehicles to turn to the OFF mode such that one or more of the remote vehicles has sufficient fuel weight to provide at least a threshold grip on a surface that is traversed by the vehicle system.

In another aspect, the electrical isolation module is configured to communicate the feedback data to the energy management system so that the energy management system can determine which of the remote vehicles to turn to the ON mode and which of the remote vehicles to turn to the OFF mode over time to balance or alternate fuel usage by different ones of the remote vehicles such that a plurality of the remote vehicles have sufficient fuel to propel the vehicle system when needed for an upcoming portion of the upcoming terrain.

In another aspect, the feedback data includes an amount of remaining fuel carried by at least one of the remote vehicles.

In another aspect, the electrical isolation module is configured to communicate the feedback data to the transportation network scheduling system so that the transportation network scheduling system can examine a geographic distance between a location of the vehicle system and a refueling location and examine an amount of remaining fuel carried by one or more of the remote vehicles to at least one of control movement of at least one other vehicle system in a transportation network or determine which of the remote vehicles to turn to an ON mode of operation or which of the remote vehicles to turn to an OFF mode of operation In another aspect, the electrical isolation module is configured to communicate the feedback data to the transportation network scheduling system so that the transportation network scheduling system can examine a geographic distance between a location of the vehicle system and a refueling location and examine an amount of remaining fuel carried by one or more of the remote vehicles to determine if the vehicle system can skip refueling at the refueling location.

In another aspect, the electrical isolation module is configured to switch at least one of the remote vehicles from an ON mode of operation where the at least one of the remote vehicles supplies electrical energy to the communication module to an OFF mode where the at least one of the remote vehicles does not supply the electrical energy to the communication module only after at least one other remote vehicle in the consist switches from the OFF mode to the ON mode.

In another aspect, the electrical isolation module is configured to determine which of the remote vehicles to turn to an OFF mode where the remote vehicle does not supply electrical energy to the communication module while keeping one or more other remote vehicles in an ON mode where the one or more other remote vehicles supply the electrical energy to the communication module based on at least one of a remaining fuel carried by one or more of the remote powered rail vehicles, a first distribution of the remaining fuel carried by a plurality of the remote powered rail vehicles along a length of the system, a mass or weight of one or more portions of the system, or a second distribution of the mass or weight of a plurality of portions of the system along the length of the system.

In another aspect, the electrical isolation module is configured to change which of the remote vehicles is turned to an OFF mode where the remote vehicle does not supply electrical energy to the communication module to achieve a distribution of at least one of fuel or weight carried by the remote powered rail vehicles.

In another aspect, the electrical isolation module is configured to change which of the remote vehicles is turned to an ON mode to supply electrical energy to the communication module and which of the remote vehicles is turned to an OFF mode to not supply the electrical energy to the communication module based on one or more of fuel efficiencies of the remote vehicles, a terrain of one or more segments of a trip being traversed by the remote vehicles, or tractive efforts produced by the remote vehicles.

In another embodiment, a method is provided that includes instructing one or more remote powered vehicles in an electrically coupled consist to turn to an OFF mode when at least one other remote powered vehicle in the consist remains in an ON mode.

In another aspect, the instructing step includes instructing the at least one other remote powered vehicle to remain in the ON mode to maintain a communication link between the at least one other remote powered vehicle and a controller that remotely directs tractive efforts provided by one or more of the remote powered vehicles.

In another aspect, the instructing step includes instructing the at least one other remote powered vehicle to remain in the ON mode to continue supplying electrical energy to a communication module that establishes the communication link.

In another aspect, the instructing step includes instructing the one or more remote powered vehicles to turn to the OFF mode of operation only after a communication device of the consist receives sufficient electric current from a source other than the one or more remote powered vehicles to maintain a communication link with a controller that remotely directs tractive efforts provided by one or more of the remote powered vehicles.

In another aspect, the instructing step includes instructing the one or more remote powered vehicles to turn to the OFF mode only after instructing at least one other remote powered vehicles to turn to the ON mode.

In another aspect, the method also includes receiving feedback data related to operation of at least one of the remote powered vehicles and the instructing step includes instructing the one or more remote powered vehicles to turn to the OFF mode based on the feedback data.

In another aspect, the feedback data includes at least one of an amount of remaining fuel carried by at least one of the remote powered vehicles.

In another aspect, the method also includes determining at least one of tractive effort or braking effort required from one or more of the remote powered vehicles based on the feedback data. The instructing step includes instructing which of the remote powered vehicles to turn to the OFF mode or to the ON mode based on the tractive effort or the braking effort.

In another aspect, the method also includes determining movement schedules of one or more vehicle systems in a transportation network. The instructing step includes instructing which of the remote powered vehicles to turn to the ON mode or to the OFF mode based on the movement schedules.

In another aspect, the method includes determining at least one of the remote powered rail vehicles in the consist that is controlled by the lead powered rail vehicle in the DP operation and the instructing step includes instructing at least one other remote powered rail vehicle in the consist to turn off to withhold the tractive effort.

In another aspect, the determining step includes determining which of the remote powered rail vehicles to turn off based on the tractive power demand as determined by at least one of an energy management system or a transportation network scheduling system.

In another aspect, the method also includes receiving feedback data from one or more of the remote powered rail vehicles in the consist, wherein the determining step includes determining which of the remote powered rail vehicles to turn off based on the feedback data.

In another aspect, the feedback data includes at least one of an amount of remaining fuel carried by at least one of the remote powered rail vehicles or a mass or weight of the remaining fuel carried by at least one of the remote powered rail vehicles.

In another aspect, the instructing step includes instructing the one or more remote powered rail vehicles in the consist to turn off to withhold the tractive effort only after at least one other remote powered rail vehicle in the consist remains on or switches on to supply the tractive effort.

In another aspect, the determining step includes determining which of the remote powered rail vehicles to turn off based on at least one of a remaining fuel carried by one or more of the remote powered rail vehicles, a first distribution of the remaining fuel carried by a plurality of the remote powered rail vehicles along a length of the system, a mass or weight of one or more portions of the system, or a second distribution of the mass or weight of a plurality of portions of the system along the length of the system.

In another aspect, the determining step includes determining which of the remote powered rail vehicles is turned off to withhold the tractive effort and which of the remote powered rail vehicles is turned on to supply the tractive effort over time to achieve a distribution of at least one of fuel or weight carried by the remote powered rail vehicles.

In another embodiment, a retrofit kit is provided that includes an electrical isolation module operable to be installed in at least a lead vehicle that is coupled with one or more remote vehicles that are electrically coupled with each other to define a consist. The electrical isolation module is configured to be communicatively coupled with at least one of the remote vehicles and to electrically isolate a communication module of one or more of the remote vehicles so as to reduce or eliminate a voltage drop during a defined electromechanical event, and thereby to maintain communications of the communication module with the lead vehicle.

Another embodiment relates to a control system for a vehicle consist, e.g., a train. The control system comprises a control module. The control module is configured for operable connection with a communication module of a first powered vehicle of the vehicle consist. (The vehicle consist includes the first powered vehicle and a remote vehicle sub-consist comprising plural second powered vehicles mechanically and electrically linked together. For example, the first powered vehicle could be a first locomotive, and the remote vehicle sub-consist could comprise group of two, three, or more locomotives mechanically and electrically linked to one another and spaced apart from the first powered vehicle, by plural non-powered rail cars, for example.) The control module is further configured to generate controls signals, for communication by the communication module from the first powered vehicle to the remote vehicle sub-consist, to turn off at least one of the second powered vehicles while at least one other of the second powered vehicles remains turned on. For example, in the case of a remote vehicle sub-consist having two adjacent and mechanically and electrically linked vehicles, an engine of the first of the two vehicles could be turned off (e.g., no longer generating electricity, such as through an alternator) while the engine of the second of the two vehicles could be left turned on (e.g., continuing to generate electricity).

According to various aspects of the invention, a consist may be defined based on one or more of the following: mechanical linkages, where all vehicles in a consist are mechanically linked and adjacent to at least one other vehicle in the consist; electrical linkages, where vehicles are electrically linked for possibly transferring electrical power between the vehicles; and/or operational/functional linkages, where plural vehicles are controlled in a coordinated manner, e.g., certain modes of distributed power operations. As one example, in a rail vehicle context, a locomotive consist comprises plural locomotives that are mechanically (and possibly electrically) linked together, with each locomotive linked and adjacent to at least one other locomotive in the consist.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope.

While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including", "includes", and "in which" are used as the plain-English equivalents of the respective terms "comprising", "comprises", and "wherein". Moreover, in the following claims, the terms "first", "second", and "third", etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable a person of ordinary skill in the art to practice the embodiments of invention, including making and using any devices or systems and performing any incorporated methods. The patentable scope of the invention is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising", "including", or "having" an element or a plurality of elements having a particular property may include additional such elements not having that property.

Since certain changes may be made in the above-described systems and methods, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system, comprising:
a first propulsion subsystem operable to provide electrical energy to a first communication device when operating in an ON mode; an
a second propulsion subsystem operable to provide electrical energy to a second communication device when operating in the ON mode;
wherein the first communication device and the second communication device are used to communicate with each other to coordinate control tractive efforts of the first propulsion subsystem and the second propulsion subsystem, and
wherein the first propulsion subsystem and the second propulsion subsystem are controllable in a mode of operation where if one of the first propulsion subsystem or the second propulsion subsystem is controlled to be in an OFF mode, the other of the first propulsion subsystem and the second propulsion subsystem provides electrical energy to the respective first communication device or the second communication device such that the first communication device and the second communication device can continue to communicate with each other to continue coordination of the control of the tractive efforts of the first propulsion subsystem and the second propulsion subsystem.

2. The system of claim 1, wherein at least one of the first propulsion subsystem or the second propulsion subsystem is controlled through instructions received via at least one of the first communication device or the second communication device from a remotely located controller device.

3. The system of claim 2, wherein at least one of the first propulsion subsystem or the second propulsion subsystem are controllable in a distributed power (DP) operation of the system to define a consist, and the at least one of the first propulsion subsystem or the second propulsion subsystem that is controlled in the DP operation remains in the ON mode to supply tractive effort when the other of the first propulsion subsystem or the second propulsion subsystem is in the OFF mode.

4. The system of claim 1, wherein the first propulsion subsystem and the second propulsion subsystem are configured to provide the electrical energy to the first communication device and the second communication device that are portions of a common communication housing that is disposed onboard only one of a first vehicle that includes the first propulsion subsystem or a separate, second vehicle that includes the second propulsion subsystem.

5. The system of claim 4, wherein the first propulsion subsystem and the second propulsion subsystem are configured to provide the electrical energy to the communication module when at least one of the first propulsion subsystem or the second propulsion subsystem are operating in the ON mode, and thereby to provide the electrical energy to the communication module during operation at an electrical energy that is at or above a threshold energy level.

6. The system of claim 1, wherein the first communication device is located onboard a first vehicle that includes the first propulsion subsystem and the second communication device is located onboard a second vehicle that includes the second propulsion subsystem, and
the first propulsion subsystem can supply the electrical energy to both the first communication device and the second communication device when the first propulsion subsystem is operating in the ON mode, and
the second propulsion subsystem can supply the electrical energy to both the first communication device and the second communication device when the second propulsion subsystem is operating in the ON mode.

7. The system of claim 1, wherein the first propulsion subsystem switches from the ON mode to the OFF mode only after the second propulsion subsystem switches from the OFF mode to the ON mode.

8. The system of claim 1, wherein the first propulsion subsystem is operable to propel a first vehicle and the second propulsion subsystem is operable to propel a second vehicle, and the first and second vehicles are mechanically coupled to each other.

9. The system of claim 1, wherein at least one of the first propulsion subsystem or the second propulsion subsystem includes a feedback module operable to transmit feedback data related to operation of at least one of the first propulsion subsystem or the second propulsion subsystem to a controller device; and
at least one of the first propulsion subsystem or the second propulsion subsystem turns to the OFF mode when instructed by the controller device based on the feedback data.

10. The system of claim 9, wherein at least one of the first propulsion subsystem or the second propulsion subsystem receives instructions from an energy management system of the controller device, the instructions controlling at least one of the tractive efforts or braking effort provided by one or more of the first propulsion subsystem or the second propulsion subsystem based on the feedback data.

11. The system of claim 9, wherein at least one of the first propulsion subsystem or the second propulsion subsystem is configured to turn to the ON mode or to the OFF mode based on instructions received from the controller device that interfaces with a transportation network scheduling system that determines movement schedules of a vehicle propelled by one or more of the first propulsion subsystem or the second propulsion subsystem and at least one other vehicle traveling within a common transportation network.

12. The system of claim 9, wherein the feedback data includes at least one of an amount of remaining fuel carried by at least one of the first propulsion subsystem or the second propulsion subsystem, and the controller device determines which of the first propulsion subsystem and the second propulsion subsystem to turn to the ON mode or the OFF mode based on the feedback data.

13. The system of claim 1, wherein the first propulsion subsystem does not consume fuel to generate the electrical energy when the first propulsion subsystem is in the OFF mode and the second propulsion subsystem does not consume fuel to generate the electrical energy when the second propulsion subsystem is in the OFF mode.

14. The system of claim 1, further comprising an isolation module configured to direct the first propulsion subsystem to at least one of remain in the ON mode or to switch to the ON mode from the OFF mode prior to the second propulsion subsystem switching from the ON mode to the OFF mode.

15. The system of claim 14, wherein the isolation module is further configured to direct the first propulsion subsystem to remain in the ON mode until after the second propulsion subsystem switches back to the ON mode from the OFF mode and the second propulsion subsystem is providing the electrical energy to the second communication device.

16. The system of claim 14, wherein the isolation module also is configured to direct the second propulsion subsystem to at least one of remain in the ON mode or to switch to the ON mode from the OFF mode prior to the first propulsion subsystem switching from the ON mode to the OFF mode.

17. The system of claim 16, wherein the isolation module is further configured to direct the second propulsion subsystem to remain in the ON mode until after the first propulsion subsystem switches back to the ON mode from the OFF mode and the first propulsion subsystem is providing the electrical energy to the second communication device.

* * * * *